(12) United States Patent
Burns et al.

(10) Patent No.: US 12,515,160 B2
(45) Date of Patent: Jan. 6, 2026

(54) GAS FILTER SEPARATOR FILTER CARTRIDGE WITH KEYS AND/OR BAFFLE

(71) Applicant: Parker-Hannifin Corporation, Cleveland, OH (US)

(72) Inventors: Jack D. Burns, Aledo, TX (US); Stephen G. Jeane, Weatherford, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 670 days.

(21) Appl. No.: 17/883,814

(22) Filed: Aug. 9, 2022

(65) Prior Publication Data

US 2023/0058004 A1 Feb. 23, 2023

Related U.S. Application Data

(60) Provisional application No. 63/303,380, filed on Jan. 26, 2022, provisional application No. 63/235,898, filed on Aug. 23, 2021.

(51) Int. Cl.
*B01D 46/24* (2006.01)
*B01D 46/00* (2022.01)
*B01D 46/42* (2006.01)

(52) U.S. Cl.
CPC ..... *B01D 46/2414* (2013.01); *B01D 46/0005* (2013.01); *B01D 46/0041* (2013.01); *B01D 46/4227* (2013.01); *B01D 2265/028* (2013.01); *B01D 2267/30* (2013.01); *B01D 2271/027* (2013.01); *B01D 2277/10* (2013.01)

(58) Field of Classification Search
CPC ........ B01D 2265/021; B01D 2265/026; B01D 2265/028; B01D 46/2403; B01D 46/2411; B01D 46/2414; B01D 46/0041; B01D 46/0005; B01D 46/4227; B01D 2271/027;
(Continued)

(56) References Cited

U.S. PATENT DOCUMENTS 5,893,956 A 4/1999 Perry, Jr. et al.
7,014,685 B2 3/2006 Burns et al.
(Continued)

FOREIGN PATENT DOCUMENTS

EP 2543425 B1 3/2015
WO WO 1997/24169 A2 7/1997

OTHER PUBLICATIONS

Parker Hannifin Corporation; Titan PuraSep, PECO Series 75 Gas Filter-Separator, PECO Series 70 Dry Gas Filter; www.parker.com/ipf; 2019; 12 pages.

*Primary Examiner* — Robert Clemente
(74) *Attorney, Agent, or Firm* — Reinhart Boerner Van Deuren P.C.

(57) ABSTRACT

A filter system comprises a pressure vessel housing with internal components designed to remove solid particles, semi-solid particles, and liquid droplets from a gas phase media. The filter housing utilizes multiple replaceable filter cartridges. The system includes a keyed filter coalescer cartridge designed to flow from the inside open area of the cartridge to the outside annular area of the housing prior to leaving the system through an outlet nozzle. The key is designed to locate a baffle of the filter cartridge inlet side end cap in a certain orientation as to provide enhanced liquid removal performance for the system. The baffle may also serve as a handle.

33 Claims, 14 Drawing Sheets

(58) Field of Classification Search
CPC ............ B01D 2277/10; B01D 2267/30; B01D 46/003; B01D 46/0031; B01D 46/58
See application file for complete search history.

(56) References Cited

U.S. PATENT DOCUMENTS

| | | |
|---|---|---|
| 8,062,523 B2 | 11/2011 | Cloud et al. |
| 8,293,106 B2 | 10/2012 | Cloud et al. |
| 8,499,939 B2 | 8/2013 | Cloud et al. |
| 8,845,899 B2 | 9/2014 | Cloud et al. |
| 8,951,333 B2 | 2/2015 | Cabourdin et al. |
| 8,961,644 B2 | 2/2015 | Burns et al. |
| 9,815,012 B2 | 11/2017 | Cloud et al. |
| 10,137,391 B2 | 11/2018 | Burns et al. |
| 10,195,558 B2 | 2/2019 | Dye et al. |
| 10,343,096 B2 | 7/2019 | Cloud et al. |
| 10,758,850 B2 | 9/2020 | Burns et al. |
| 11,071,934 B2 | 7/2021 | Cloud et al. |
| 2004/0134171 A1* | 7/2004 | Scott .................. B01D 46/0002 55/482 |
| 2006/0086075 A1* | 4/2006 | Scott .................. B01D 46/0001 55/498 |
| 2008/0190082 A1* | 8/2008 | Scott .................. F02M 35/0201 55/520 |
| 2009/0071111 A1* | 3/2009 | Lundgren .............. F01M 13/04 55/385.4 |
| 2021/0046415 A1 | 2/2021 | Tiffany et al. |

\* cited by examiner

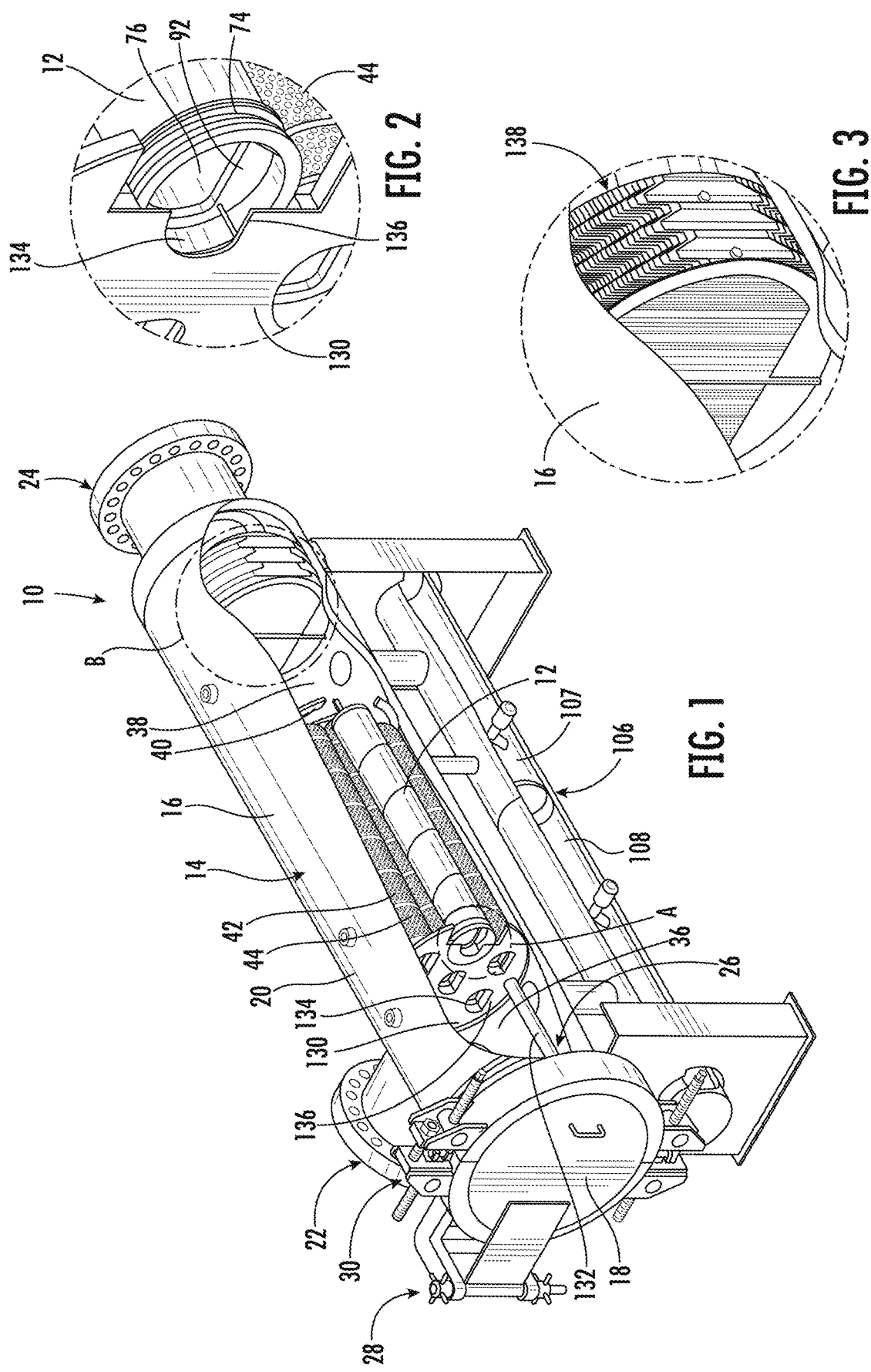

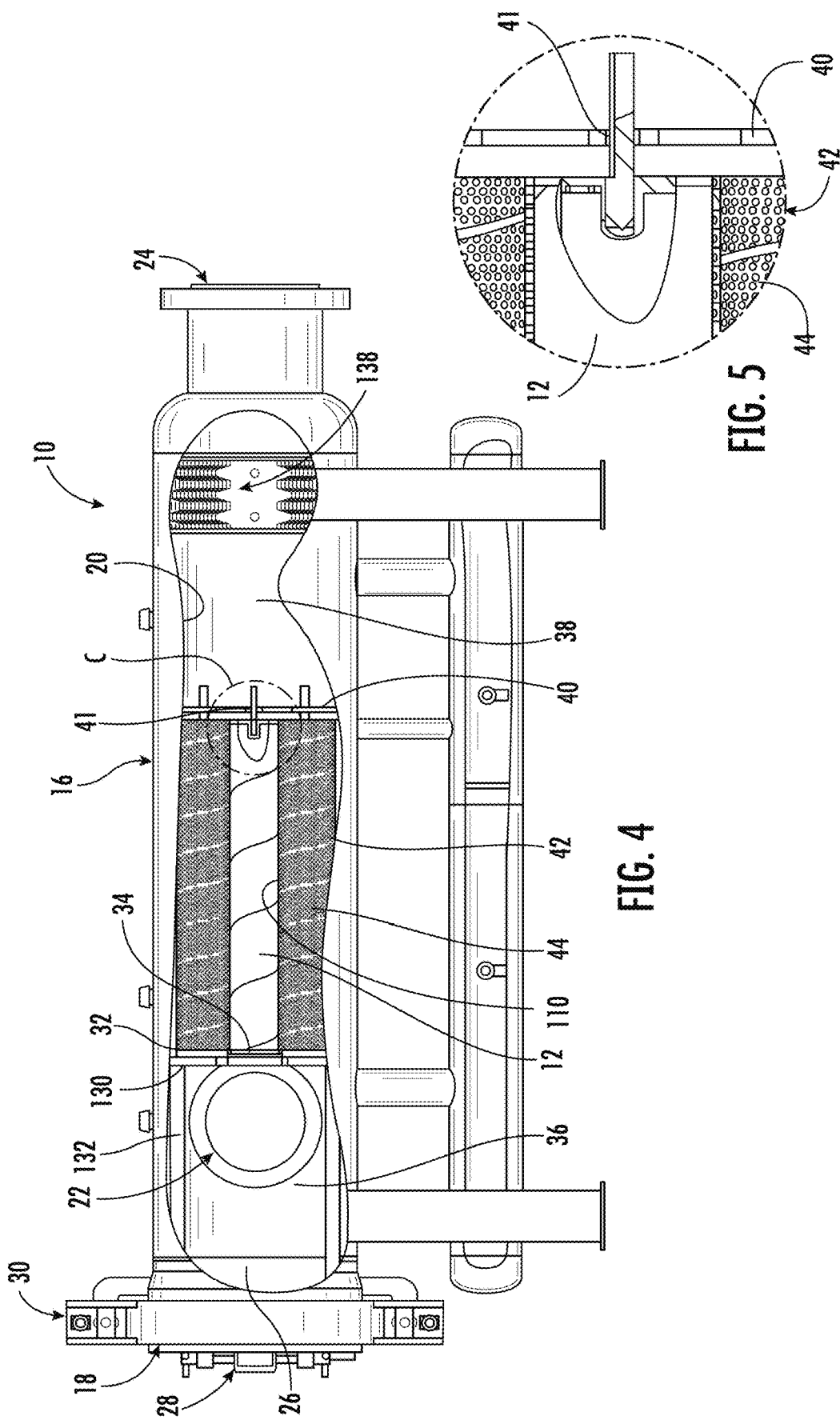

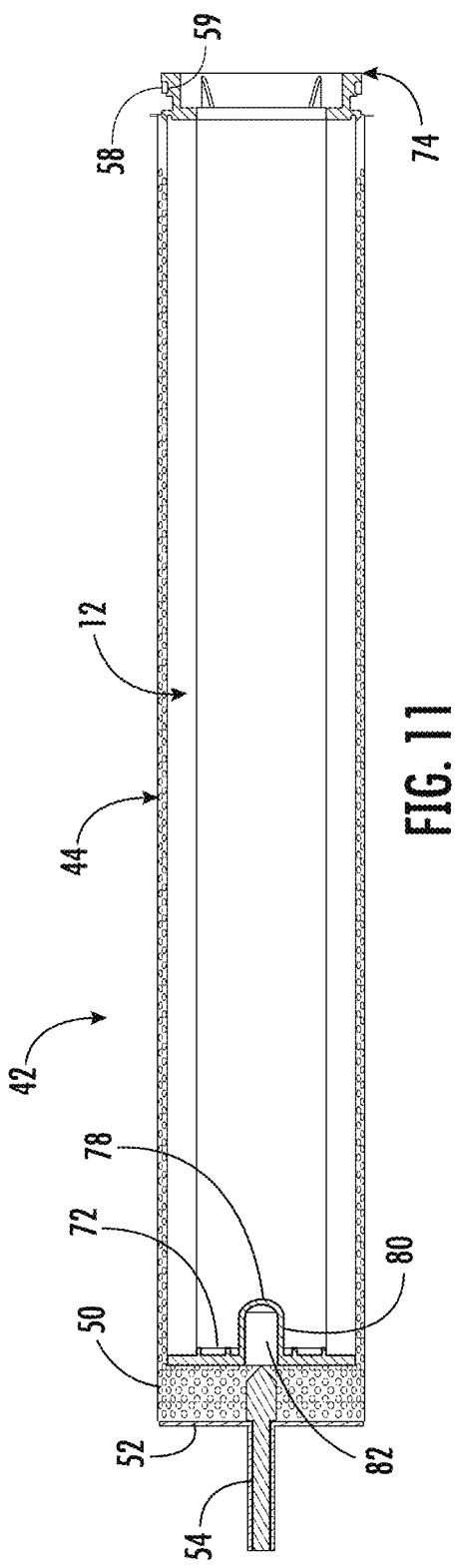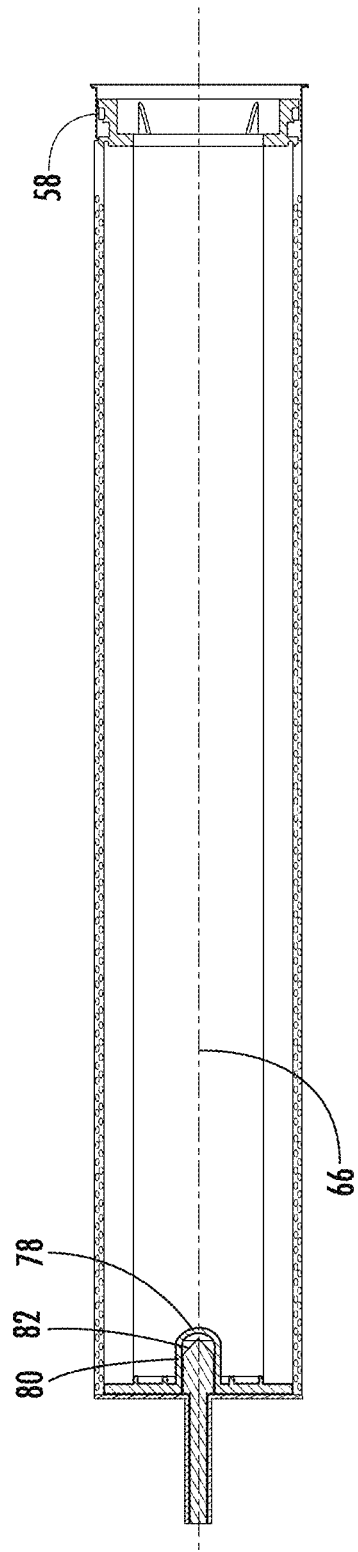

GAS FILTER SEPARATOR FILTER CARTRIDGE WITH KEYS AND/OR BAFFLE

CROSS-REFERENCE TO RELATED PATENT APPLICATIONS

This patent application claims the benefit of U.S. Provisional Patent Application No. 63/303,380, filed Jan. 26, 2022 and U.S. Provisional Patent Application No. 63/235,898, filed Aug. 23, 2021; the entire teachings and disclosure each of which are incorporated herein by reference thereto.

FIELD OF THE INVENTION

The present invention is generally directed toward gas phase filter separators that remove solid and liquid particles from a gas stream, and more particular to flow paths and/or alignment considerations in such filter cartridges of gas phase filter separators.

BACKGROUND

A known gas phase separator is TITAN PURASEP® product of the present Assignee covered under U.S. Pat. No. 10,195,558). The TITAN PURASEP® product is a popular product offering contaminant loading capacity, safe and easy operation, and excellent performance.

One exemplary technology used for such gas phase separators are the present Assignee's PEACH® line of products as described in U.S. Pat. Nos. 5,893,956, 8,293,106, 8,499,939, 8,845,899, 8,062,523; all patents of which are hereby incorporated by reference as the filter media tubes disclosed therein are useable for the filter media of the present disclosure.

Basic filter cartridge configurations are also disclosed in the present Assignee's XtreamPure® products line (see e.g. US Patent Nos. U.S. Pat. Nos. 8,961,644 and 10,137,391) and the Assignee's Gemini 2 products (see e.g. U.S. Pat. Nos. 10,343,096 and 9,815,012). In some instances, the filter cartridges provide two-stages or more stages of filtration, while in other instances one-stage of filtration is provided. As also shown in some of these examples, handles may be employed to help facilitate removal and installation of such filter cartridges. These may include gasket such as a radial seal such as shown therein (e.g. see also U.S. Pat. No. 10,758,850).

Also, keying and locking arrangements for filter cartridges of gas phase separators are known or have been proposed such as demonstrated by U.S. Pat. Nos. 11,071,934 and 7,014,685.

While various solutions exist, additional innovations in relation to alignment, keying, or flow characteristics can be had as will be realized from disclosure herein. Embodiments herein may also provide for a simplified, lower cost product for gas phase filter separators.

SUMMARY

One aspect of the present invention is a filter separator that uses an inside-out flow filter coalescer cartridge with a finger pull ledge oriented by a key to be located in the downward position to drive gas flow to the top of the inside of the cartridge to improve the efficiency of liquid removal. The separator can handle the same gas flow rate with fewer filter coalescer cartridges than may be necessary with the current Titan™ product. An embodiment of the invention retains removed solids inside the filter cartridge offering less internal housing cleaning effort.

The filter cartridge can be designed with a finger pull ledge extending across the bottom of the filter cartridge inlet side end cap. The finger pull ledge can be utilized as an area where an operator can grab ahold of the cartridge, with his or her hand or a tool, for installation and extraction of the filter cartridge.

The filter cartridge preferably includes a key as may be incorporated in a hollow-shaped key receiver that can interact with a lock (e.g. a like shaped key) attached to the housing's internal support basket.

Alignment of the key receiver, located on the replaceable filter cartridge, and the lock (i.e. corresponding basket key), permanently fixed to the housings support basket, can locate the finger pull ledge at the bottom position towards the base.

The filter cartridges are designed to remove solid and semi-solid contaminant and designed to coalesce liquid mist particles as the gas flows through the filter cartridge media.

There can be advantages to the keying to ensure the proper cartridges are installed.

Computational Fluid Dynamic analysis indicates that the addition of a flow baffle that can be provided by the finger pull ledge offers benefit to overall system liquid removal performance.

Positioning such a baffle as may be provided by the finger pull ledge, as aligned by the key, to the bottom location directs the gas flow towards the upper half of the filter cartridge internal area as the gas travels down the length of the cartridge. As liquid mist enters the inlet port of the cartridge end cap, it will naturally settle by gravity to the bottom of the cartridge where it will eventually drain through the cartridge to the annular area of the housing before making its way to the first stage liquid collection sump (collection area). Locating the finger pull ledge at the bottom orientation drives the gas towards the top of the internal area of the cartridge lowering the effective gas flux rate through the bottom half of the filter media where the liquid is concentrated the most prior to drainage. Lowering the flux rate where most of the liquid is present creates larger coalesced liquid droplets and increases overall liquid removal efficiency. Faster coalescer media flux rates will generally produce smaller liquid droplets and potential droplet aerosolization leading to excessive aerosols entering the annular area of the housing and existing with the outlet gas stream.

Finger pull ledges and handles are used on some inside-out flow filter cartridges; however, such ledges and handles have not been used in conjunction with a key to set a certain finger pull ledge rotational orientation designed to enhance coalescer cartridge efficiency.

An inventive aspect is directed to a key on a filter cartridge.

Another inventive aspect is directed toward a baffle on a filter cartridge.

These two aspects may be used separately or more preferably in conjunction with each other.

A more particular inventive aspect is directed toward a filter cartridge, comprising: (a) a tubular ring of a filter media surrounding a central cavity, the tubular ring extending around a central axis between an inlet end and an outlet end; (b) an outlet end cap secured to the outlet end of the tubular ring, the outlet end cap including a cover portion closing the central cavity at the outlet end; and (c) a projection projecting from the cover portion toward the inlet end into the central cavity, the projection intersecting the central axis and including an annular wall defining a socket, the annular wall having an interruption along an inner periphery thereof providing a key.

According to this aspect, the filter cartridge may further also feature an inlet end cap secured to the inlet end, the inlet end cap defining a flow opening entering into the central cavity.

According to this feature a baffle may be provided at the inlet end cap. The key is arranged relative to the baffle at a predetermined orientation to direct fluid flow away from a gravitational bottom of the tubular ring of the filter media.

The tubular ring of filter media can extend horizontally between the inlet end cap and the outlet end cap.

Another more particular inventive aspect is directed toward a filter cartridge comprising: (a) a tubular ring of a filter media surrounding a central cavity, the tubular ring extending around a central axis horizontally between an inlet end and an outlet end; (b) an outlet end cap secured to the outlet end of the tubular ring, the outlet end cap including a cover portion closing the central cavity at the outlet end; (c) an inlet end cap secured to the inlet end, the inlet end cap defining a flow opening entering into the central cavity; and (d) a baffle at the inlet end cap, the baffle arranged relative to the flow opening to direct fluid flow away from a gravitational bottom of the tubular ring of the filter media.

Preferably, this aspect is used in connection with a key provided by the filter cartridge arranged relative to the baffle at a predetermined orientation.

The key can be adapted to ensure proper orientation for directing fluid flow away from the gravitational bottom of the tubular ring of the filter media.

For any of the aspects above, one or more of the features in the below paragraphs may be use in conjunction therewith.

The annular wall (that can provide the key) may defines a partial circle along the inner periphery thereof.

The interruption to provide for the key may comprise a flat, a ridge, a groove, an eccentric or any combination thereof.

For example, the interruption can comprises a flat facing inwardly toward the central axis, preferably as an axially extending chord section extending along side the central axis.

Although the application may be used to multiple stage filters, preferably the tubular ring of the filter media provides a single filtration stage, with the filter cartridge being a single stage filter.

The baffle may be integrated into the inlet end cap.

The baffle can partially obstruct a bottom half of the inlet end cap, wherein the flow opening includes an upper portion above the central axis and a lower portion below the central axis, with the baffle providing a greater flow area to the upper portion than the lower portion.

In such an arrangement, preferably the upper portion defines a flow area that is at least 1.1 times greater than the lower portion, more preferably at least 1.25 times greater than the lower portion, and most preferably at least 1.39 times greater than the lower portion.

The baffle may define a ledge projecting across a segment of the flow opening, the ledge extending below the central axis.

The ledge preferably defines a chord extending across the flow opening of the inlet end cap.

The key can be provided by a projection projecting from the cover portion either externally or internally.

The projection form the key may project from the cover portion of the outlet end cap toward the inlet end into the central cavity (of the tubular ring of filter media). The projection can intersecting the central axis and including an annular wall defining a socket, with the annular wall having an interruption along an inner periphery thereof providing the key, thereby being internally directed.

The key comprises an interruption that may be a flat, a ridge, a groove, an eccentric or any combination thereof.

The key can be provided by either one of the inlet and outlet end caps, but is preferably on the outlet end cap.

The key can comprise an interruption offset from the central axis, providing an off-center key.

The baffle can be integral with a border frame portion of the inlet end cap.

The baffle can be provided by a web traversing across the border frame portion, with the web is recessed within a well spaced from an upstream face of the inlet end cap, so that the well first receives fluid flow before entering the flow opening.

The baffle may also be configured as a handle to facilitate installation and/or removal by a service technician.

The filter cartridge may feature a radial seal in which the outer radial periphery of the inlet end cap carries the radial seal configured for radially outward sealing.

The filter media used may comprise an aerosol coalescer comprising a depth filter media with the filter media defining a filtration flow path in a radial direction through the depth filter.

Depth filter media is different than typical thin pleated air filter arrangements that act as a surface loading filter or where the fluid only passes through the a single sheet layer of thickness. Depth filter media can be configured so that fluid to pass through at least 0.6 centimeter of the filter media before exiting the filter media when a pressure differential exists between the central cavity and an external, and more preferably at least 2.2 centimeter of the filter media when a pressure different exists between the central cavity and an outside of the tubular ring of the filter media.

The filter cartridge can be combined with a basket to provide a filter basket assembly in which the basket removably receives the filter cartridge. The basket comprises: a ring mount including a solid tubular portion; a perforated cylindrical tube, and a basket cap including a central mounting post; wherein the ring mount and the basket cap are secured to opposing ends of the perforated cylindrical tube. The filter cartridge can be installed in the basket with a seal sealing between the ring mount and the inlet end cap. The post supports a lock projection that extends internally toward the ring mount, with the lock projection having a lock surface keyed to the key that rotationally fixes the filter cartridge and the basket at a predetermined angular orientation.

Preferably the filter cartridge is oriented within the basket with the baffle arranged along the bottom of the flow opening.

With such arrangement, baffle orientation on the inlet end cap can be positioned along a bottom portion due to the lock surface keyed to the key.

The filter cartridge and basket can be incorporated into a filter assembly comprising: (a) a housing comprising a pressure vessel and a door, the pressure vessel including a horizontally extending tubular wall and having an inlet port, an outlet port and an access port at one end of the horizontally extending tubular wall, the door mounted to the pressure vessel, the door having an open position allowing access into the pressure vessel and a closed position sealing shut the access port; (b) a partition internally mounted within the horizontally extending tubular wall, the partition having at least one filtration opening, and dividing the pressure vessel into an inlet side and an outlet side, the access port being at the inlet side; and (c) an outlet grid internally mounted within the horizontally extending tubular wall in horizontally spaced relation from the partition. At least one basket assembly is provided (e.g. each comprising one filter cartridge and one basket). Each basket assembly is mounted to partition through a corresponding respective member of the at least one filtration opening (in the partition). Each basket assembly comprises the filter cartridge and a basket removably receiving the filter cartridge (the basket comprising: (a) a ring mount including a solid tubular portion, (b) a perforated cylindrical tube, and (c) a basket cap mounted to the outlet grid; wherein the ring mount and the basket cap are secured to opposing ends of the perforated cylindrical tube). The filter cartridge is installed in the basket with a seal sealing between the ring mount and the inlet end cap. The basket cap supports a lock projection that extends internally toward the ring mount with the lock projection having a lock surface keyed to the key that rotationally fixes the filter cartridge and the basket at a predetermined angular orientation.

Typically in such a filter assembly, multiple such filter cartridges are provided in parallel fluid circuit with each, resulting in a plurality of the "at least one basket assembly" being provided in parallel fluid circuit with each other.

Another feature (which may also be separate inventive aspect), may further comprise a removable backflow plate arranged upstream of the partition between the partition and the access port. The backflow plate is arranged in close proximity over the at least one basket assembly to prevent the filter cartridge from dislodging and/or unsealing from the ring mount in the even of a back-pulse. The back flow plate further comprises: at least one flow aperture, with one flow aperture axially aligned with the flow opening of each of the at least one basket assembly, and at least one second baffle, each second baffle along a corresponding respective member of the at least one flow aperture and in axial alignment with the baffle of the filter cartridge of a corresponding respective member of the at least one basket assembly to protect the inlet end cap from gas erosion during use.

Other inventive aspects are below, which may be also used in connection with one or more features above.

Another inventive aspect pertains to a filter assembly, comprising: (A) a housing comprising a pressure vessel and a door, the pressure vessel including a horizontally extending tubular wall and having an inlet port, an outlet port and an access port at one end of the horizontally extending tubular wall, the door mounted to the pressure vessel, the door having an open position allowing access into the pressure vessel and a closed position sealing shut the access port; (B) a partition internally mounted within the horizontally extending tubular wall, the partition having a plurality of filtration openings, and dividing the pressure vessel into an inlet side and an outlet side, the access port being at the inlet side; (C) an outlet grid internally mounted within the horizontally extending tubular wall in horizontally spaced relation from the partition; (D) a plurality baskets, each filter basket mounted in a corresponding respective member of the filter openings and mounted to the outlet grid, each basket comprising: (a) a ring mount including a solid tubular portion, (b) a perforated cylindrical tube, and (c) a basket cap mounted to the outlet grid; wherein the ring mount and the basket cap are secured to opposing ends of the perforated cylindrical tube; (E) a plurality of filter cartridges, each filter cartridge removably mounted in a corresponding respective member of the baskets, with a seal sealing between the ring mount and the inlet end cap, each filter cartridge comprising: (a) a tubular ring of a filter media surrounding a central cavity, the tubular ring extending around a central axis horizontally between an inlet end and an outlet end; (b) an outlet end cap secured to the outlet end of the tubular ring, the outlet end cap including a cover portion closing the central cavity at the outlet end; and (c) an inlet end cap secured to the inlet end, the inlet end cap defining a flow opening entering into the central cavity; and (F) a removable backflow plate arranged upstream of the partition between the partition and the access port, the backflow plate arranged in close proximity the filter cartridges to prevent the filter cartridges from dislodging and/or unsealing from the ring mount in the even of a back-pulse, the back flow plate further comprising: (a) a plurality of flow apertures, each flow aperture axially aligned with the flow opening of a respective member of the filter cartridges, (b) a plurality of flow baffles, each flow baffle along a corresponding respective member of the flow apertures and arranged along a bottom portion thereof, wherein the flow baffles direct fluid flow away from a gravitational bottom of the filter cartridges.

Where such a backflow plate is used, preferably each filter cartridge further comprises an integrated baffle at the inlet end cap, the integrated baffle arranged relative to the flow opening to direct fluid flow away from a gravitational bottom of the tubular ring of the filter media, the integrated baffle being axially aligned with respective one of the flow baffles of the back flow plate.

Another inventive aspect is directed toward filter cartridge for installation within a housing, the filter cartridge comprising: (a) an elongated, cylindrical filter media body circumscribing a central cavity; (b) a first end cap at one end of the body, the first end cap including a projection extending outwardly away from the end cap, the projection including a geometry for engagement with the housing when the cartridge is installed into the housing to rotationally orient the cartridge relative to the housing; and (c) second end cap at another end of the body, the second end cap including a peripheral body portion defining a central opening into the central cavity, the peripheral body portion having a ledge projecting across a segment of the central opening, the ledge having a predetermined relationship with the projection such that the ledge is positioned toward a lower side of the cartridge when the cartridge is installed within the housing.

The peripheral body portion of the second end typically has an annular configuration.

The ledge can define a chord extending across the central opening of the second end cap.

A further inventive aspect is directed toward filter assembly comprising a filter cartridge and a housing, the filter cartridge comprising: (a) an elongated, cylindrical filter media body circumscribing a central cavity; (b) a first end cap at one end of the body, the first end cap including a projection extending outwardly away from the end cap, the projection including a geometry in engagement with the housing when the cartridge is installed into the housing to rotationally orient the cartridge relative to the housing; and (c) a second end cap at another end of the body, the second end cap including a peripheral body portion defining a central opening into the central cavity, the peripheral body portion having a ledge projecting across a segment of the central opening, the ledge having a predetermined relationship with the projection such that the ledge is positioned toward a lower side of the cartridge when the cartridge is installed and supported horizontally within the housing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is an isometric view of a filter assembly that is partially cutaway through the housing and through one of the basket assemblies to better show internal arrangements therein);

FIG. 2 is an enlarged view of a circle region A of FIG. 1;

FIG. 3 is an enlarged view of circle region B of FIG. 1 to better show a downstream mist extractor which this case may take the form of a vane mist extractor;

FIG. 4 is a is a side elevation view of the filter assembly shown in FIG. 1 that is partially cutaway through the housing and through one of the basket assemblies to better show internal arrangements therein), and with circle region C showing a partial cross-section;

FIG. 5 is an enlarged view of a circle region C of FIG. 4 that better shows the keying better the basket and the filter cartridge;

FIG. 11 is a cross section of the basket assembly of FIG. 8 horizontal through the a central axis of the filter cartridge, but with the filter cartridge not yet fully installed into the basket;

FIG. 12 is a cross section of the basket assembly of FIG. 8 and similar to FIG. 11 and horizontal through a central axis of the filter cartridge, but with the filter cartridge now fully installed into the basket in radial sealing relationship;

Figure 6:
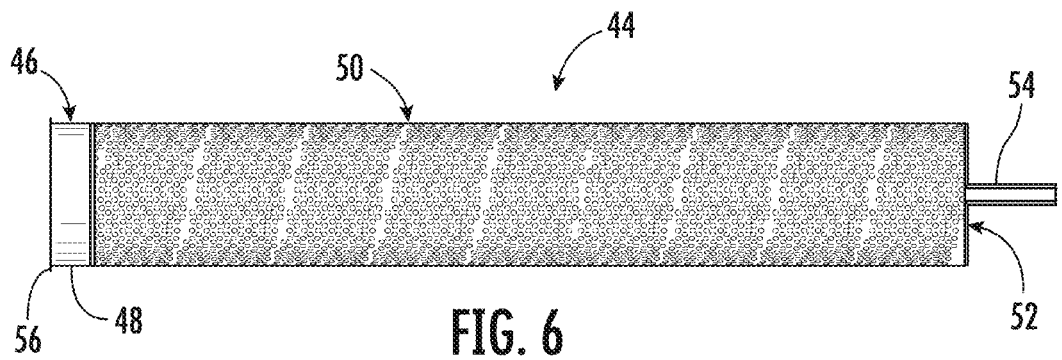
FIG. 6 is a side view of a basket used in the filter assembly of FIG. 1.
Figure 7:
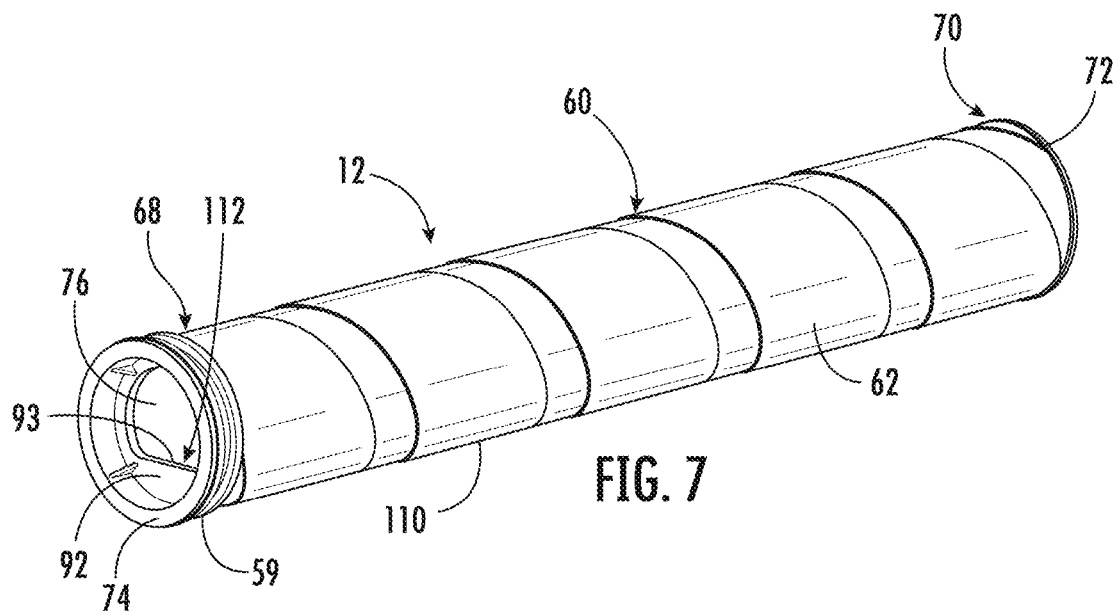
FIG. 7 is an isometric view of a filter cartridge used in the filter assembly of FIG. 1.
Figure 8:
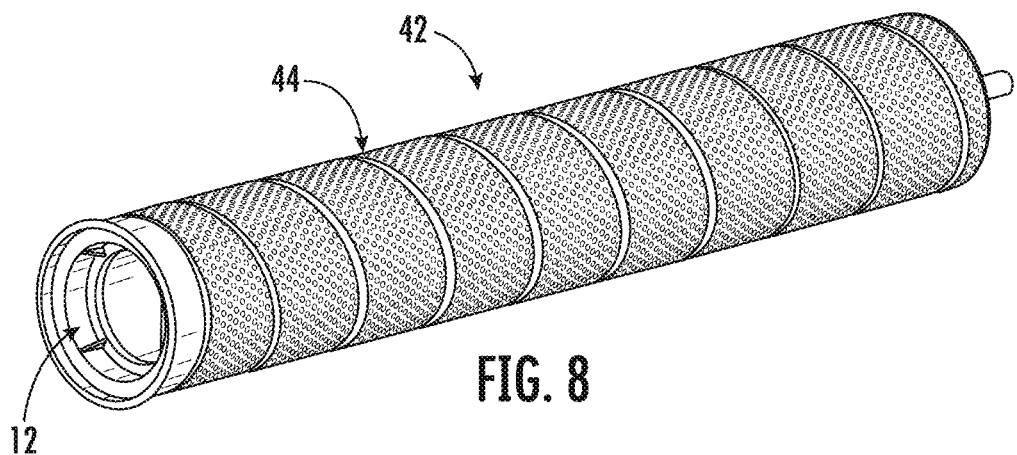
FIG. 8 is an isometric view of a basket assembly including the filter cartridge of FIG. 7 installed in the basket of FIG. 6.
Figure 9:
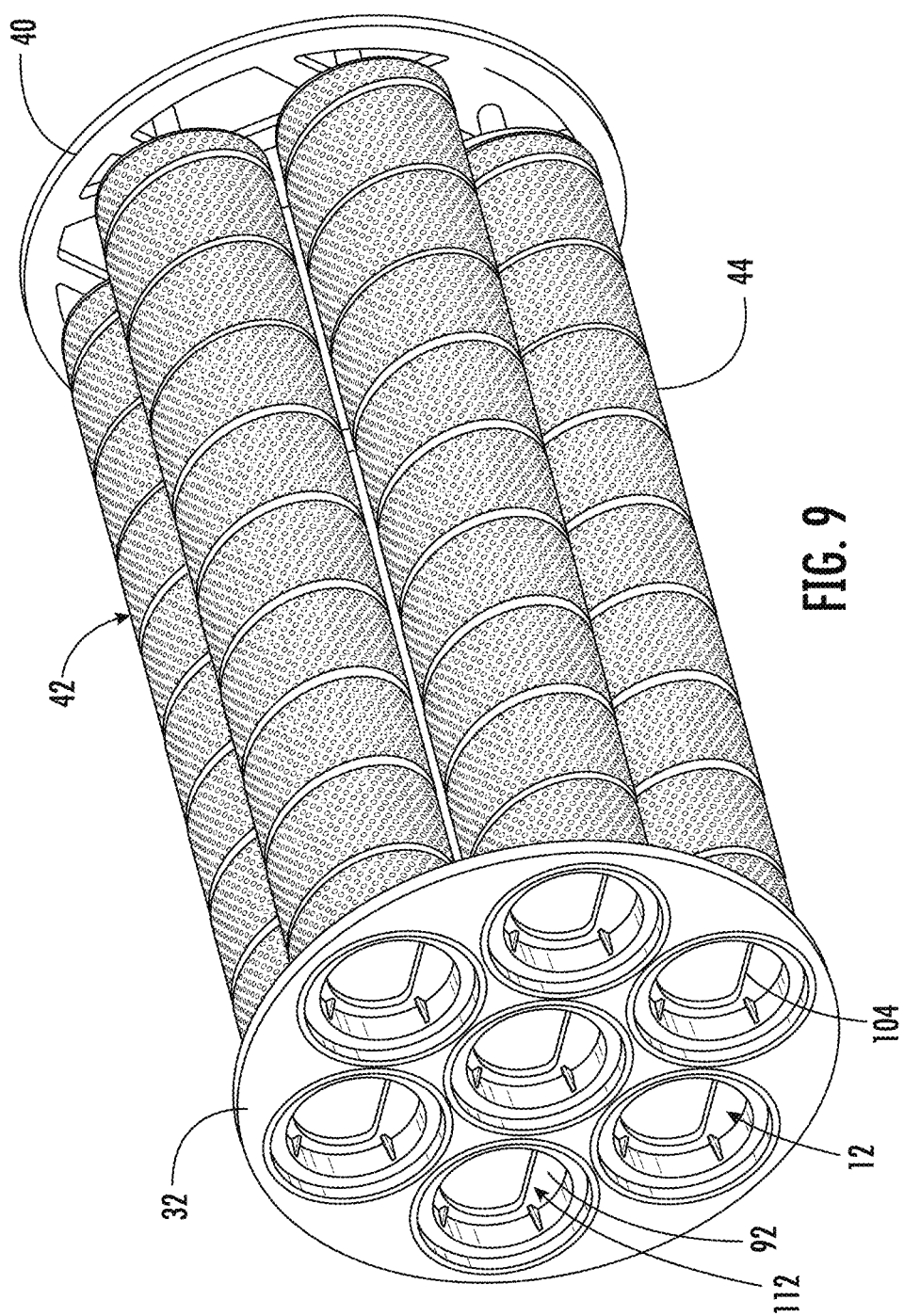
FIG. 9 is an isometric view of the internal filter assembly employed within the housing of the filter assembly of FIG. 1.
Figure 10:
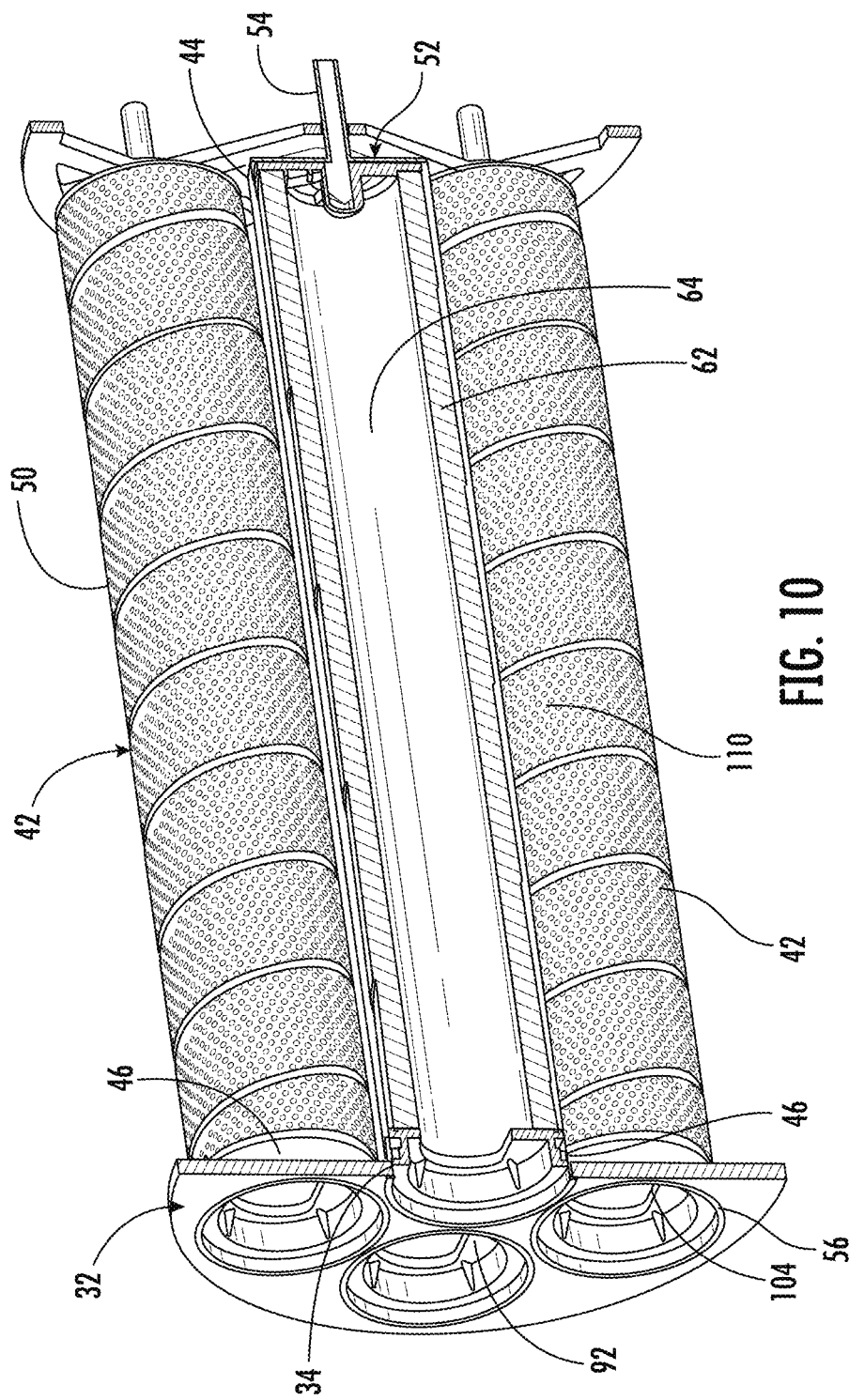
FIG. 10 is cross-sectional and isometric view of the internal filter assembly shown in FIG. 9, the cross section being taken vertically through the center of the internal
Figure 13:
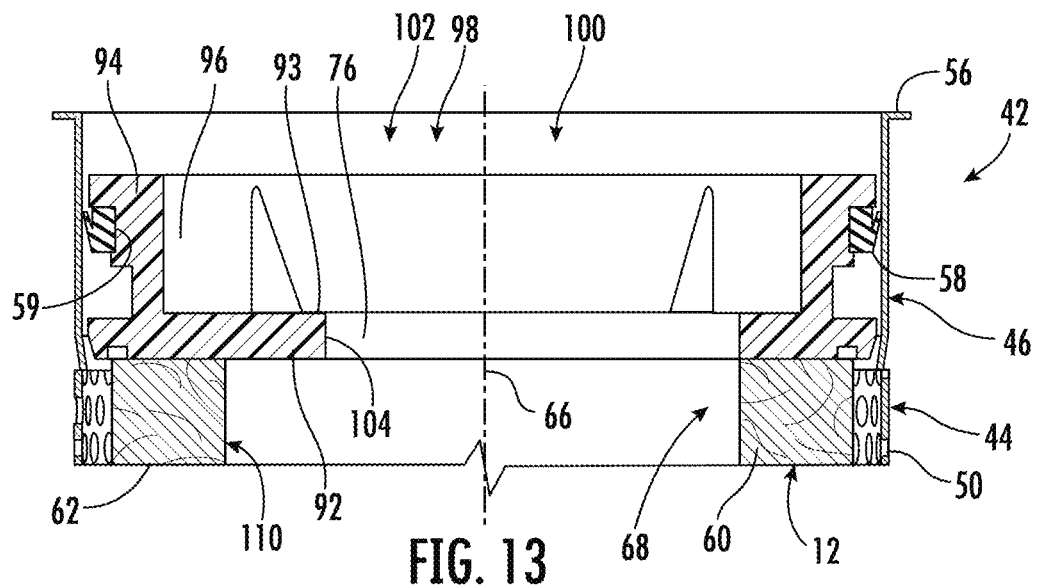
FIG. 13 s a fragmentary enlarged cross section of the basket assembly of FIG. 8 vertical through a central axis of the filter cartridge showing of the inlet end portion the basket assembly.
Figure 14:
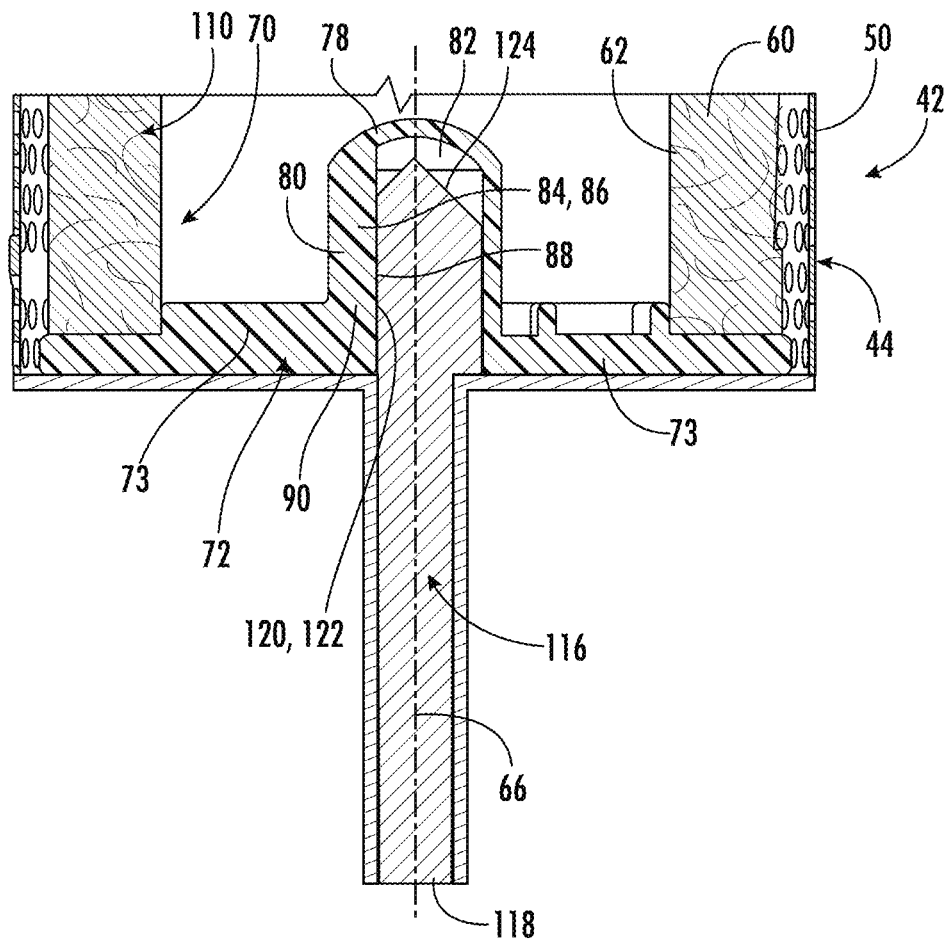
FIG. 14 is a fragmentary enlarged cross section of the basket assembly of FIG. 8 vertical through a central axis of the filter cartridge showing of the outlet end portion the basket assembly.
Figure 15:
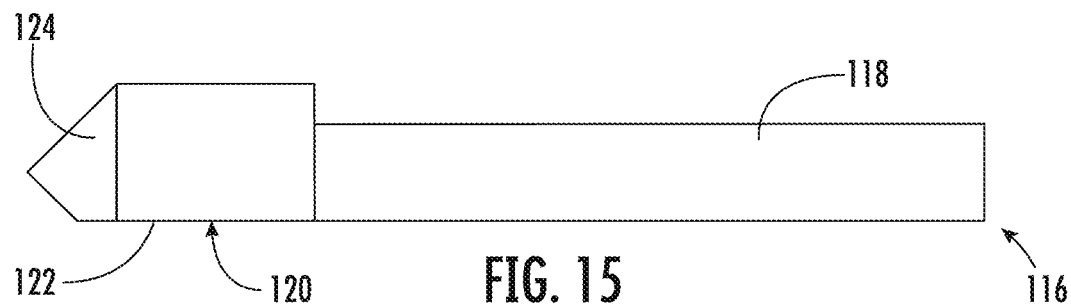
FIGS. 15, 16 and 17 are side, top and end views of the lock project of the basket shown in FIG. 6.
Figure 16:
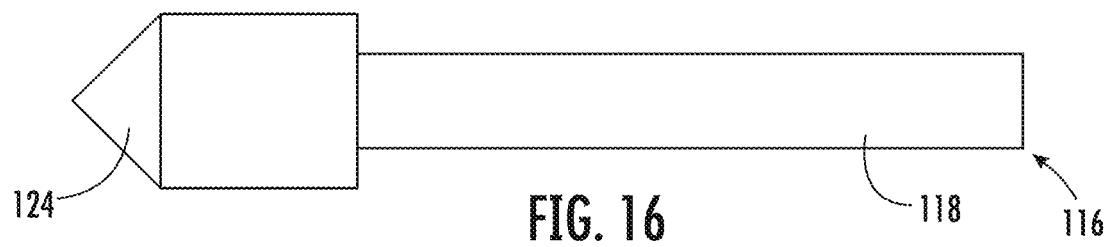
Figure 17:
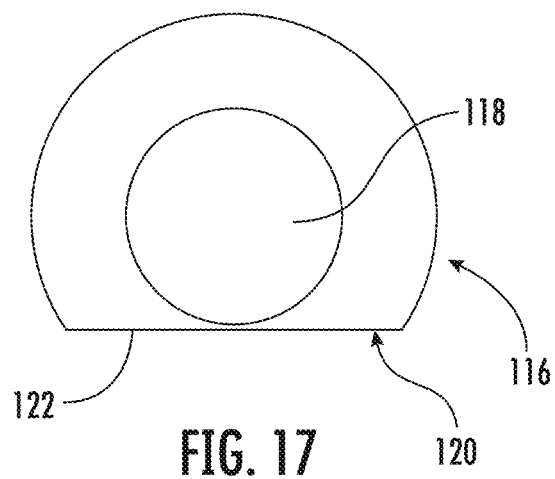
Figure 18:
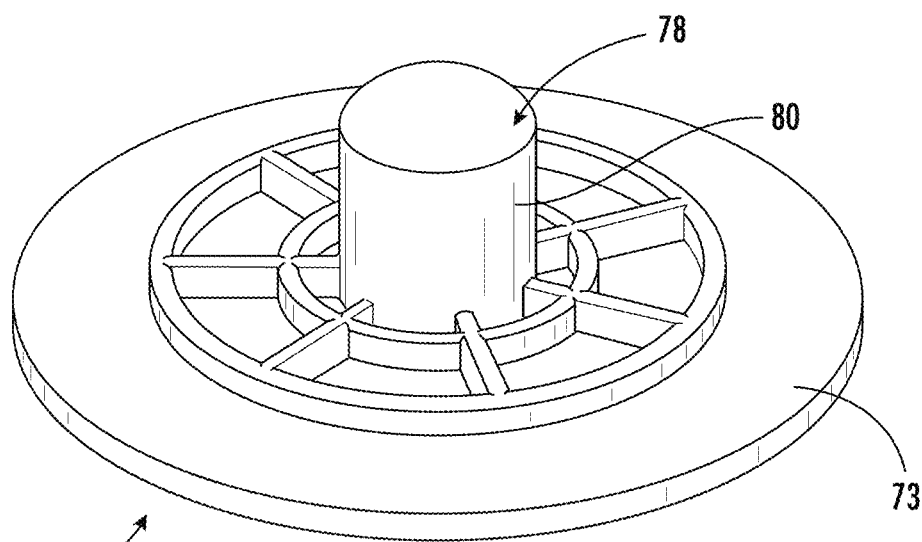
FIG. 18 is an isometric view of an internal side of the outlet end cap used for the filter cartridge of FIG. 7.
Figure 19:
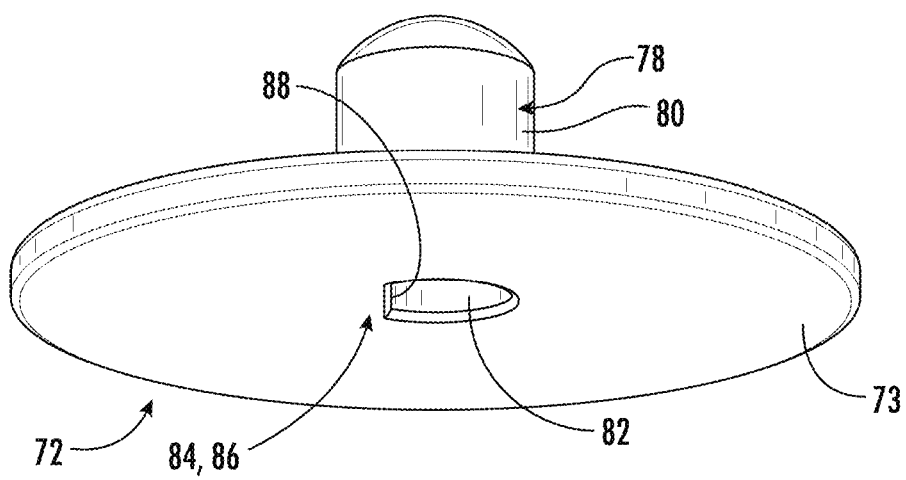
FIG. 19 is an isometric view of an external side of the outlet end cap used for the filter cartridge of FIG. 7.
Figure 20:
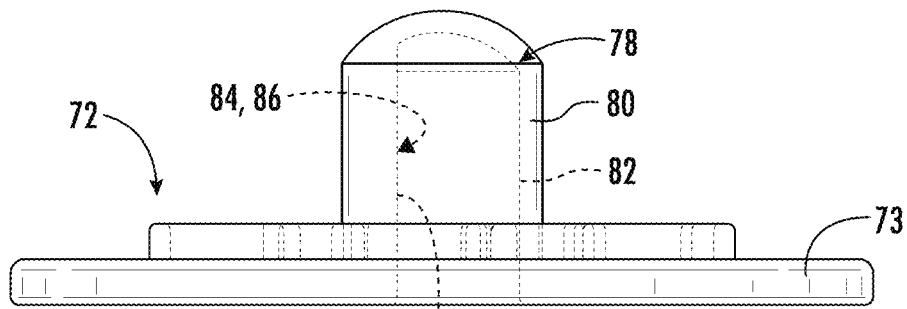
FIG. 20 is an side view of the outlet end cap used for the filter cartridge of FIG. 7.
Figure 21:
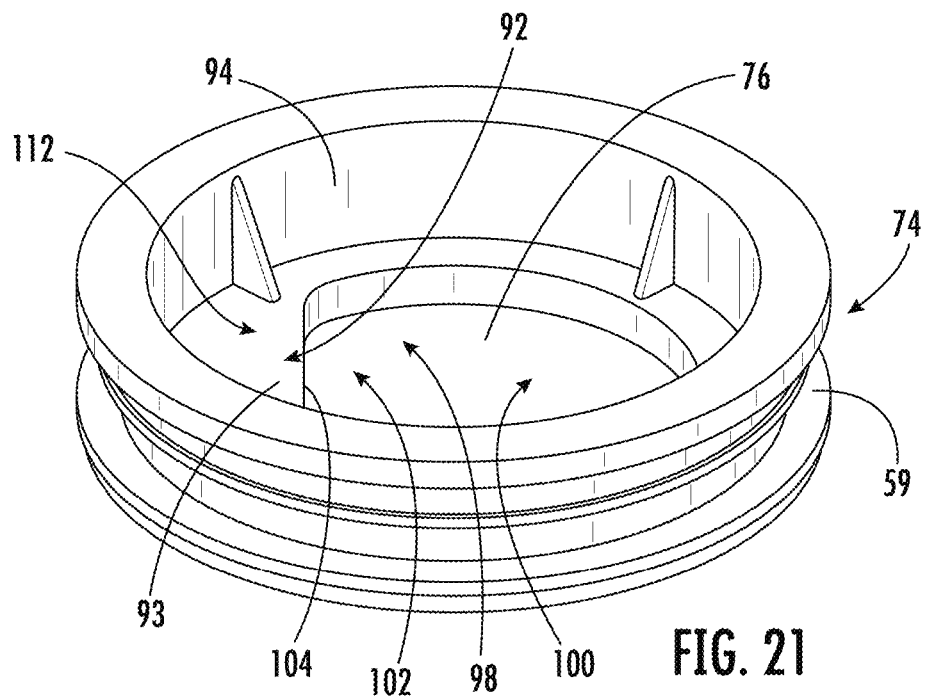
FIG. 21 is an isometric view of an external side of the inlet end cap used for the filter cartridge of FIG. 7.
Figure 22:
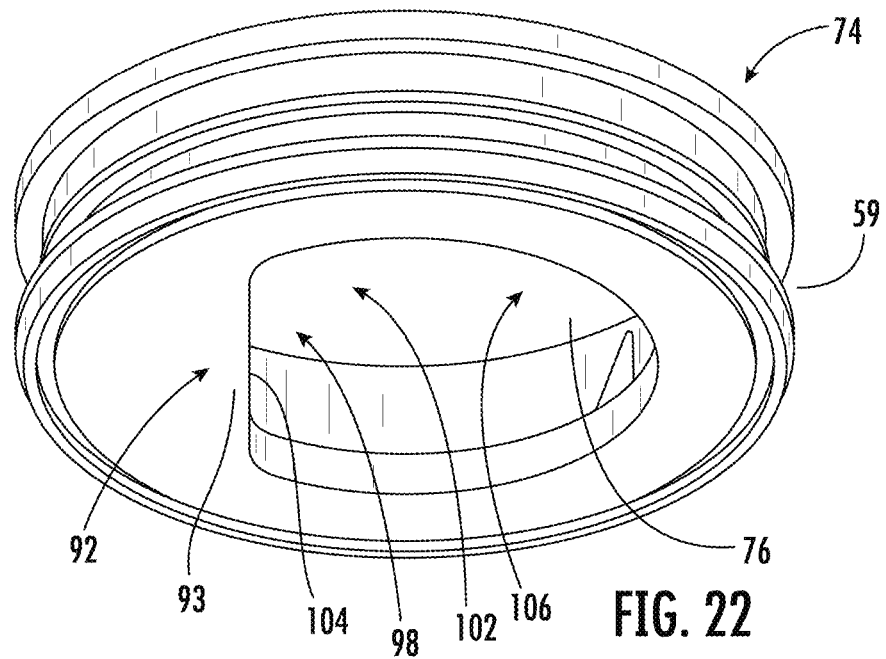
FIG. 22 is an isometric view of an internal side of the inlet end cap used for the filter cartridge of FIG. 7.
Figure 23:
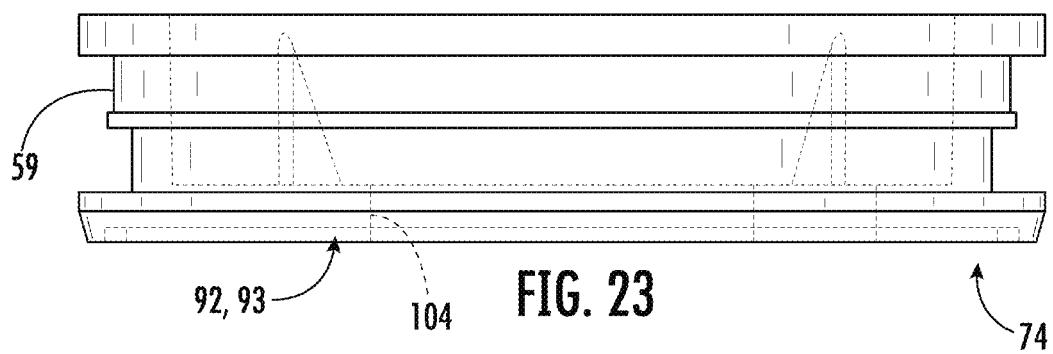
FIG. 23 is a side view the inlet end cap used for the filter cartridge of FIG. 7.
Figures 24, 25:
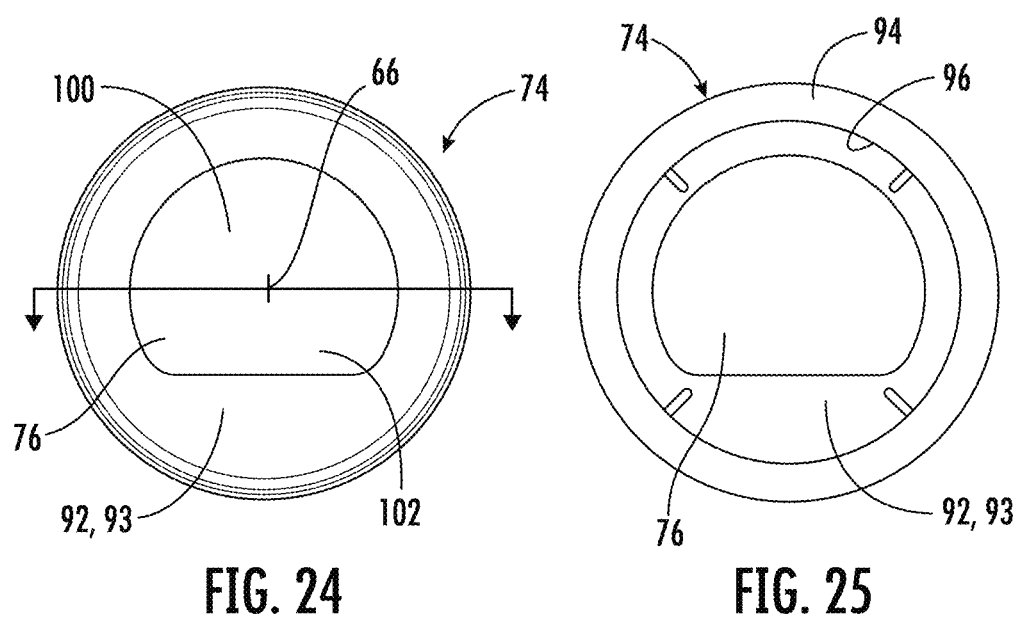
FIGS. 24 and 25 are internal end and external end views of the inlet end cap used for the filter cartridge of FIG. 7 (with a horizontal dividing line shown in FIG. 24 dividing the filter bottom half from the upper half)
Figure 27:
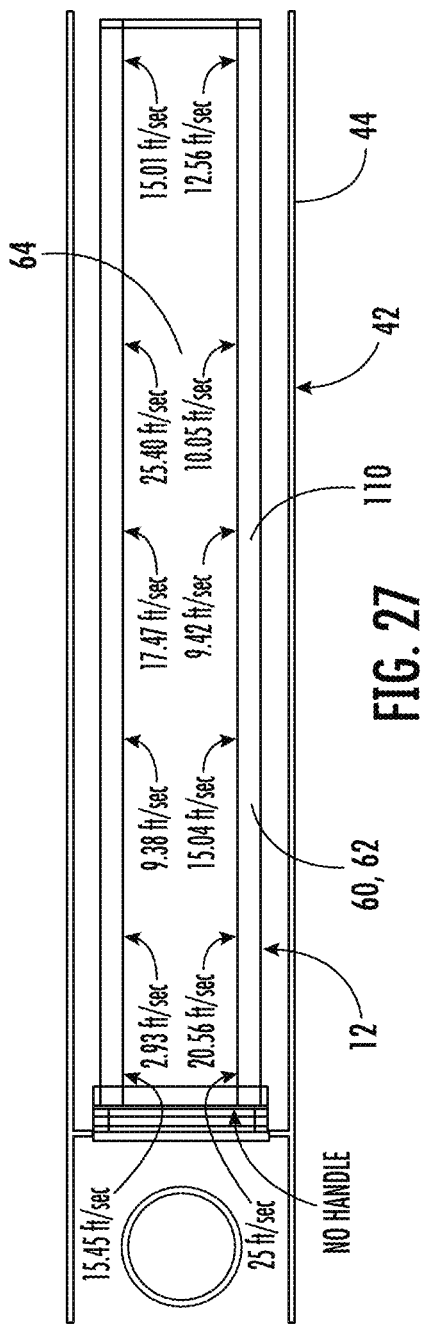
FIGS. 26 and 27 are schematic representations of the filter cartridge of FIG. 1 employed with the baffle according to an embodiment (FIG. 26) as compares to the baffle portion being removed (i.e. circular opening) (FIG. 27) demonstrating about 30% lower flux velocity (i.e. between 20%-40% lower flow flux velocity) at the gravitational bottom due to the baffle.
Figure 26:
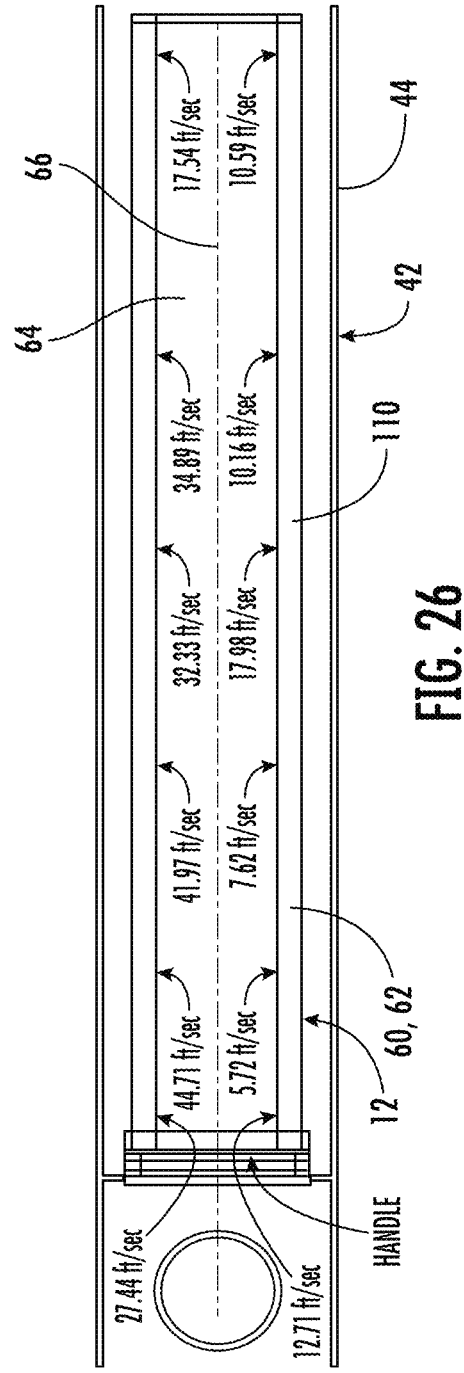

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring to FIGS. 1-5, and embodiment of the present invention is illustrated as a filter assembly 10 that includes one or more baffle features for directing higher velocity flow toward the upper portion and away from the gravitational bottoms of horizontally mounted filter cartridges 12 and keying arrangements for such filter cartridges 12. Such features will be detailed below, but first a greater understanding of a housing environment will be provided.

The filter assembly 10 comprises a housing 14 comprising a pressure vessel 16 and a closure that preferably takes the form of a movable door 18. Preferably, the vessel 16 and the door 18 are steel components sufficiently thick and sealed to provide a housing design pressure range of at least 150 PSI, and more often much higher up to about 10,000 PSI, depending upon application. The vessel 16 can be supported by a pair of support columns, one at the inlet end and another at the outlet end as shown to maintain the filter assembly its the filter cartridges 12 in horizontal relation in use.

By "horizontal" as used herein, it is meant that an alignment (such as the central axis 66 of the filter cartridge 12 being horizontal) is at true horizontal or within (plus or minus) 10 degrees of true horizontal; for example, most typically the filter cartridge central axis is at true horizontal or within 1 degree of true horizontal). Similarly, "horizontally" in the context of extending horizontally, aligned horizontally, or other similar terms is meant to allow for deviations up to 10 degrees from true horizontal (inclusive of true horizontal).

The pressure vessel 16 is preferably fabricated welded steel components to include a horizontally extending tubular wall 20 and having an inlet port 22, and an outlet port 24 and an access port 26 at one end of the horizontally extending tubular wall 20. The door 18 is mounted to the pressure vessel 16 with the door 18 having an open position allowing access into the pressure vessel 16 for servicing (e.g. cleaning and/or removal/replacement of filter cartridges 12) and a closed position sealing shut the access port 26.

The door 18 can be mounted via a hinge assembly 28 and can be closed sealed tight against the pressure vessel 16 via a closure assembly 30.

As shown, the inlet port 22 can be provided via a tubular nozzle having an inlet mounting flange, and likewise the outlet port 24 can be provided by a tubular nozzle having an outlet mounting flange; each of the inlet and outlet ports 22, 24 being welded and sealed via annular welds at inlet and outlet openings of the tubular wall.

A partition provided by partition plate 32 is internally mounted within the horizontally extending tubular wall 20. The partition plate 32 has at least one and more typically a plurality of filtration openings 34. The partition plate 32 divides an internal chamber of the pressure vessel 16 into an inlet side chamber 36 and an outlet side chamber 38, with the access port 26 being at the inlet side chamber to provide access to the filter cartridges 12 from the inlet side chamber. The inlet port 22 is fluidically connected to the inlet side chamber 36 and the outlet port 24 is fluidically connected to the outlet side chamber.

An outlet grid 40 is internally mounted within the horizontally extending tubular wall in horizontally spaced relation from the partition.

For example, the partition plate 32 and the outlet grid 40 (which may be a perforate plate with basket locating bays) can both be permanently mounted such as being welded to the horizontally extending tubular wall 20. The partition plate 32 is sealed such as through a circular weld to the internal circular surface of the horizontally extending tubular wall 20, so that fluid flow during operation proceed through filtration openings 34.

Additionally, at least one and typical several filter basket assemblies 42 are provided, a respective one to fill each filtration opening 34 within the partition plate. Each filter basket assembly 42 comprises one filter cartridge 12 and a basket 44 removably receiving the filter cartridge 12 so that the filter cartridge can be slid out for replacement when the filter cartridge is spent (e.g. full of filtered out solids or other contaminant and causing a higher pressure drop than might be desired).

The filter basket assemblies 42 and particularly the filter cartridges 12 separate aerosols and solids from the gas flow; but also such may be separate due to impingement on the walls or partitions in the inlet side chamber 36 due to impact on the wall of the vessel 16 or otherwise, and also in the outlet side chamber 38 such as due to a final mist extractor 138 that may be employed.

Any aerosols or solids removed by the separator can fall gravitationally to a sump 108 at the gravitational bottom of the vessel 14 that collects liquids and/or solids on the inlet chamber in the inlet sump region 108 and coalesced and separated liquids in the outlet chamber (e.g. that can drip from the gravitational bottom or otherwise be expelled from the filter cartridges 12) to the outlet sump region 107. The inlet sump region 108 and the outlet sump region 107 are divided by a partition wall in the sump 106 and therefore separate sump chambers due to pressure differential between inlet and outlet side chambers 36, 38. Separate drain valve cocks can be used to drain the inlet sump region 108 and the outlet sump region 107 when needed.

Returning to discussion about the basket assemblies, as shown with additional reference to FIG. 6, the basket 44 comprises a ring mount 46 that includes a solid tubular portion 48 (e.g. to facilitate a sealing surface with the filter cartridge 12); a perforated cylindrical tube 50, and a basket cap 52 including a central mounting post 54. As shown, the ring mount 46 and the basket cap 52 are secured to opposing ends of the perforated cylindrical tube 50.

The basket 12 can be weld fabricated with each of the ring mount 46, basket cap 52 and perforated cylindrical tube 50 (which as illustrated may be perforated spiral wound steel mesh) being steel components welded together.

The basket 12 is preferably permanently secured in position to the partition plate plate 32 by being welded thereto and may be sealed thereagainst via welding. For example, the ring mount 46 may include an annular flat flange 56 extending radially outward from the solid tubular portion 48 and seated against the upstream surface of the partition plate 32, and may be welded thereto at the periphery of the flange 56.

The basket 12 is aligned horizontally via the outlet grid 40, which defines hole mounts receiving the mounting posts 54 of the baskets 12, such that the central axis 66 of the filer cartridge 12 is horizontally extending.

As shown in FIG. 10-14, the filter cartridge 12 is installed in the basket 44 with a seal such may be provided by radial seal 58 sealing between the ring mount 46 and the inlet end cap of the filter cartridge 12.

Each filter cartridge 12 is removably mounted in a corresponding respective member of the baskets 44 as shown in FIGS. 1-5 and 9-10. If there is one filter cartridge 12 then there is one corresponding basket 44; whereas as shown in the illustrated embodiment of there are shown nine filter cartridges 12 and nine baskets 44, respectively. The number can be adjusted based upon the application and amount of flow and/or filtration capacity desired. When more than one filter cartridge/basket assembly is employed, typically those are provided in parallel fluid circuit with each other.

Figure 28:
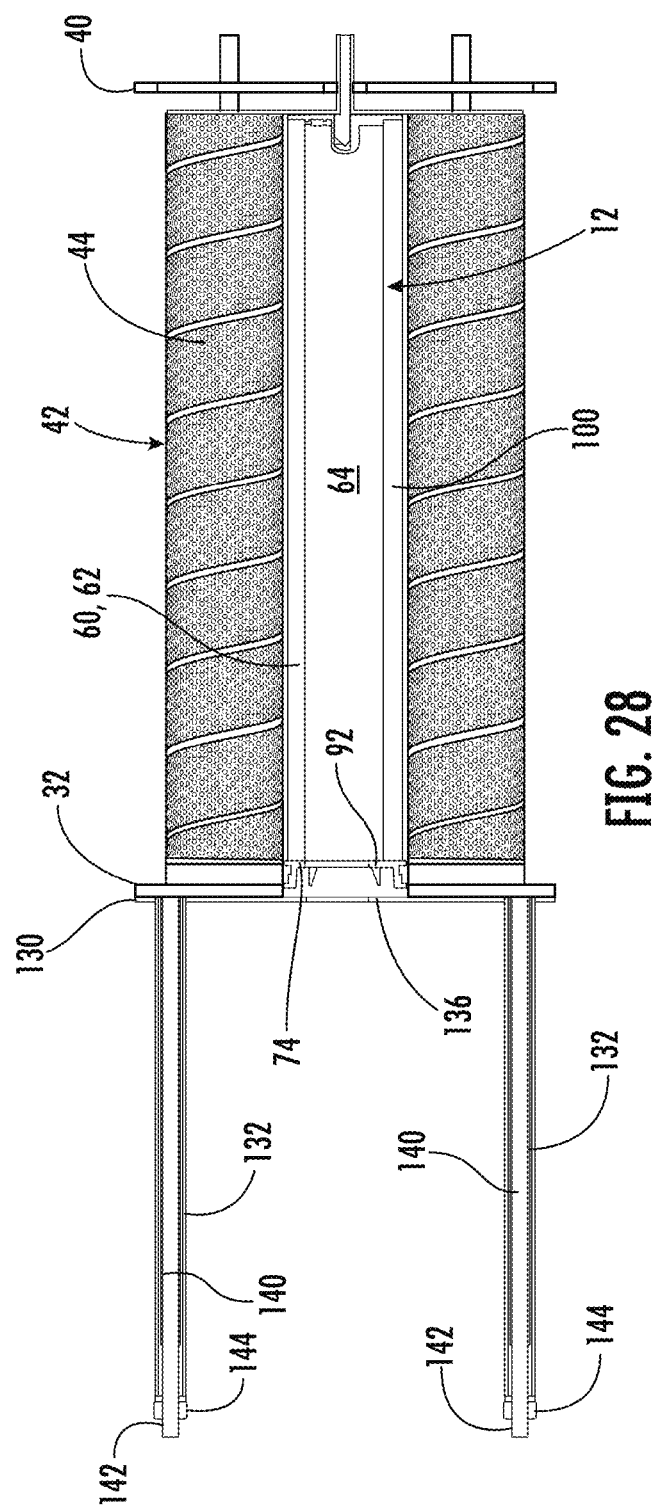
FIG. 28 is a side elevation view of the internal assembly within the pressure vessel of FIG. 1 with a vertical cross section through the partition plate and the backflow plate assembly.

Referring to FIGS. 10-14 each filter cartridge 12 comprises: a tubular ring 60 of a filter media 62 surrounding a central cavity 64 (see FIG. 28 for central cavity 64 of filter cartridge). The tubular ring 60 extends around a central axis 66 horizontally between an inlet end 68 and an outlet end 70. An outlet end cap 72 is secured to the outlet end 70 of the tubular ring 60. The outlet end cap 72 includes a cover portion 73 (e.g. a plate portion) closing the central cavity 64 at the outlet end 72 so as to prevent unfiltered airflow therethrough and to direct fluid flow through the tubular ring 60 during operation for separation of contaminants (e.g. solids, liquid droplets, aerosols, etc.) during filtration operation.

An inlet end cap 74 is secured to the inlet end 68. The inlet end cap 74 defines a cartridge flow opening 76 entering into the central cavity 64.

The inlet end cap 74 also preferably carries a gasket such as the radial seal 58, which may take the form of either a chevron seal as illustrated or may be a O-Ring gasket or other suitable gasket. Such a radial seal can be arranged and captured within a radially outward facing groove 59 defined by an outer periphery of the inlet end cap 74.

The tubular ring 60 of the filter media 62 is preferably a PEACH® filter media tube as available from Parker-Hannifin Corporation, and/or as may be embodied by U.S. Pat. Nos. 5,893,956, 8,293,106, 8,499,939, 8,845,899, 8,062, 523; which have been incorporated by reference as the filter media tubes disclosed therein are useable for the filter media of the present disclosure. PEACH® filter media tubes operate as an aerosol coalescer to separate droplets while also filtering out solids and other particulates throughout the depth of the filter media.

While PEACH® type media is preferred, the tubular ring 60 of the filter media 62 may also be provided by other configurations such as fiberglass depth material, or convoluted wrap, or possibly a pleated depth media. These types of tubular rings of filter medias can coalesce aerosols. Preferably, non-pleated filter tubular rings are provided such as illustrated, as most pleated filters are barrier surface loading and do not operate as depth filters suitable for aerosol coalescing. For example, other coalescer media options tubular ring 60 of the filter media 62 may include depth fiberglass media ranging from 0.6 to 2.54 cm in thickness, pleated coalescer materials utilizing micro-glass or polymeric materials or wound roving style filters referred to as string-wound filters, which can also be used.

A preferred aerosol coalescer comprises a depth filter media with the filter media defining a filtration flow path in a radial direction (that may include an axial component as the fluid flows may flow axially as well) through the depth filter, with the depth filter media being configured so that fluid to pass through at least 0.6 centimeters of the filter media before exiting the filter media when a pressure differential exists between the central cavity and an external, and more preferably at least 2.2 centimeters of the filter media when a pressure different exists between the central cavity and an outside of the tubular ring of the filter media. This is different than a surface loading or single pass perpendicular to filter media sheet (i.e. only through the thickness of the sheet).

The tubular ring 60 of the filter media 62 is preferably a single continuous tube as illustrated, however the tubular ring may be broken into different segments (with different filtration characteristics potentially for different segments).

Preferably the tubular ring 60 of the filter media 62 as well as the filter cartridge 12 provide a single stage of filtration as a single stage filter. Two or more stages of filtration are possible in embodiments. For example, certain features such as the socket keying aspects are also usable for two-stage filters, such as those described in several of the patents listed in the background section herein above, which are incorporated by reference for that purpose.

The filter cartridge 12 is as shown preferably and inside-out flow filter.

To provide for correct filter installation and/or to provide a preferred orientation in some embodiments of the present invention, a keying arrangement is provided. Different key arrangements may be used to align a baffle feature for example as discussed later one.

In the illustrated embodiment shown in FIGS. 10-14, the filter cartridge 12 further comprises a projection 78 projecting from the cover portion 73 toward the inlet end 68. In this manner the projection 78 projects into the central cavity 64. The projection 78 intersects the central axis 66 and includes an annular wall 80 defining a socket 82. The annular wall 80 has an interruption 84 along an inner periphery thereof providing a key 86.

The annular wall 80 defines a partial circle (and may be partly cylindrical) along the inner periphery thereof.

The interruption 84 may comprise a flat 88 as illustrated or may be a groove or a ridge (or any combination thereof such as: a flat and a groove; or a ridge and flat, or all three-a ridge, a flat and a groove). For example, the interruption may be provided by a thickened and/or irregular wall portion of the annular wall 80 as shown.

In the illustrated embodiment, the flat 88 facing inwardly toward the central axis 66 is provided an axially extending chord section 90 extending along side the central axis 66.

To facilitate a desired flow path through the filter cartridge 12, the filter cartridge 12 also includes a baffle 92 at the inlet end cap 74.

For example as shown the baffle 92 is integrated into the inlet end cap 74 as a separate web 93 the traverses partially across a circular ring portion 94 (i.e. circular border frame portion) of the inlet end cap 74. The web 93 may be recessed within a well 96 from an upstream face of the inlet end cap 74 that first receives flow before entering the flow opening 76.

The baffle 92 partially obstructs a bottom half 98 (e.g. the portion below the a the central axis 66 of the first end cap), wherein the flow opening 76 includes an upper portion 100 above the central axis 66 and a lower portion 102 below the central axis 66. As such, the baffle 92 is arranged as shown to provide a greater flow area to the upper portion 100 than the lower portion 102.

An advantage of this baffle arrangement is that the flow is directed toward the upper part of the filter cartridge 12. For example, the upper portion defines a flow area that is at least 1.1 times greater than the lower portion, more preferably at least 1.25 times greater than the lower portion, and most preferably at least 1.39 times greater than the lower portion.

There are advantages therefore to the baffle 92 (as well as the baffle of the back flow plate later identified) as being oriented along the bottom. The filter cartridges are designed to remove solid and semi-solid contaminant and designed to coalesce liquid mist particles as the gas flows through the filter cartridge media. Computational Fluid Dynamic analysis indicates that the addition of a flow baffle that can be provided by the baffle 92 offers benefit to overall system liquid removal performance.

Positioning such a baffle 92 to the bottom location directs the gas flow towards the upper half of the filter cartridge internal area as the gas travels down the length of the cartridge. As liquid mist enters the inlet port of the cartridge's inlet end cap 74, it will naturally settle by gravity to the bottom of the cartridge where it will eventually drain through the cartridge to the annular area of the housing before making its way to the first stage liquid collection sump 106 (collection area, and in particular the outlet sump 107, which is divided and a different pressure than the inlet sump region 108 as shown).

Locating the baffle 92 at the bottom orientation drives the gas towards the top of the internal area of the filter cartridge 12 lowering the effective gas flux rate through the bottom half of the filter media 62 where the liquid is concentrated the most prior to drainage. Lowering the flux rate where most of the liquid is present creates larger coalesced liquid droplets and increases overall liquid removal efficiency. Faster coalescer media flux rates will generally produce smaller liquid droplets and potential droplet aerosolization leading to excessive aerosols entering the annular area of the housing (i.e. the outlet side chamber 38) and exiting with the outlet gas stream.

For example as schematically indicated in the cross sections of FIGS. 26 and 27 the filter cartridge 12 with the baffle according to an embodiment as compared to the baffle portion being removed (i.e. circular opening), computational Fluid Dynamic analysis demonstrates about 30% lower flux velocity (i.e. between 20%-40% lower flow flux velocity) at the gravitational bottom 110 due to the baffle 92 for many typical operating parameters of such gas flow separators.

Computational Fluid Dynamic analysis can be performed by Flow Simulator by Solidworks or Ansys Fluent Software.

Additionally, the flow baffle 92 may also be configured as an integrated handle 112, such as being provided by a finger pull ledge 104 facilitated by the web 93 having enough vertical height to allow fingers to get behind and allow a mechanic to pull the filter out with sufficient force to overcome the frictional engagement (including sealing engagement). Accordingly as shown, the baffle 92 defines the ledge 104 projecting across a segment of the flow opening, with the ledge extending below the central axis, for example the ledge defines a chord extending across the flow opening of the inlet end cap as shown.

The top of the ledge 104 facing the central axis 66 is preferably flat, however, ledge top surface may be irregular or uneven.

As a consequence for these or other reasons, there can be advantages to the keying to ensure the proper cartridges are installed and/or that the proper cartridge is used. The socket 82 which provides key 86 is an example of one key configuration for locating the baffle 92, however, the key could be located at a different location on the outlet end cap 72 or even at a different location on the filter cartridge 12. However, the socket 82 and key 86 is advantageous.

As applied to the flow baffle 92, the baffle 92 (and finger pull ledge 104 that may be provided thereby) has a predetermined rotational orientation designed to enhance coalescer cartridge efficiency so as to direct flow and higher velocity flow away from the gravitational bottom 110 of the tubular ring 60 of the filter media 62.

To provide for proper keying, it may be recalled that the basket 44 is arranged at a predetermined fixed angular orientation relative to the pressure vessel 16 and outlet grid 40, for example being welded in place.

The basket 44 then provides a lock projection 116 (such as may be a spear member 118 as shown) that is supported by in fixed relation to the basket cap's mounting post 54. For example, the lock projection 116 can be welded to the basket cap 52, and thereby fixed to mounting post 54 via such welding or other similar securement to achieved the desired predetermined orientation for the keying so as to facilitate locating the baffle 92 along the bottom.

The lock projection 116 extends internally toward the ring mount 46, and has a lock surface 120 keyed to the key 86 of the filter cartridge 12 so as to rotationally fix the filter cartridge 12 and the basket 44 at a predetermined angular orientation. This can orient the filter cartridge in a predetermined orientation with the baffle 92 along the bottom portion as indicated above, so that reliably the baffle is at that location otherwise the filter cartridge does not install.

The lock surface 120 has a complimentary shape to that of the key 86 such as a lock flat 122 that contacts and keys with the key 86 so as to prevent relative rotation therebetween. The lock projection 116 also comprises a tapered tip 124 to help naturally align and guide movement into the socket 82 until the filter cartridge 12 is keyed to the basket 44, with the filter cartridge 12 is sealing relationship with the basket 44.

For additional integrity, preferably a removable backflow plate 130 (see FIGS. 1, 4, 28) is arranged upstream of the partition plate 32 between the partition plate 32 and the access port 26. As shown, the backflow plate 130 is arranged in close proximity and immediate adjacent an upstream face of the inlet end caps of to the filter cartridges 12 to prevent the filter cartridges from dislodging and unsealing from the ring mount in the even of a back-pulse.

Referring to FIG. 28, the back flow plate 130 can be held in place at its axial position by stops/fastening receivers along the inside periphery of the vessel 16 proximate the access port 26 by virtue of rigid positioning rods such as hollow tubes 132 that are cantilevered (e.g. such as welded) to the back flow plate 130 at different positions around the perimeter. Other rigid rods such as pipes 140 are cantilevered (e.g. such as welded) to the partition plate 32, in which the pipes 140 pass through apertures in the back flow plate 130 and through the hollow interiors of the hollow tubes 132.

The pipes 140 can have threaded ends 146 whereby nuts 144 (and preferably washers) are used to tighten and compress the back flow plate 130 toward and preferably in abutting relation of the partition plate 32 and/or the basket flange 56 (FIG. 10) that may extend over the upstream surface of the partition plate 32.

The back flow plate 130 further includes one or more flow apertures 134 (at least one flow aperture corresponding to each filter basket assembly 42), with each flow aperture 134 axially aligned with the flow opening 76 of a respective member of the filter cartridges 12.

Additionally, the back flow plate 130 also includes one or more flow baffles 136 (a flow baffle for each flow aperture 134). Each flow baffle 136 extends along a corresponding respective member of the flow apertures 134 and is arranged along a bottom portion thereof. As is the case with each filter cartridge's baffle 92, the back flow plate's flow baffles 136 might be also used to direct fluid flow away from a gravitational bottom of the filter cartridges 12 and in an embodiment could provide additional flow characteristic such as those described above in relation to filter cartridges.

However, such back flow plate flow baffles 136 are typically not close enough as may be desired to the tubular ring 60 of the filter media 62 to have the effect of directing the fluid velocity away from the gravitational bottom 110. The closer the baffle structure is to the tubular ring 60 of the filter media 62 the better the effect at least with the configurations provided. Accordingly, there are advantage to providing the primary baffle 92 on the filter cartridge 12 itself to locate close to the tubular ring of filter media. For example, recessing the web 93 for the baffle 92 within the well 96 from an upstream face of the inlet end cap 74 locates the baffle 92 closer to the tubular ring 60 of filter media 62; and/or the well 96 may provided a localized initial open collection chamber in the inlet end cap that may also stabilize flow before passing the baffle 92 and entering the flow opening 76.

Further, because the filter outlet and inlet end caps 72, 24 are preferably molded plastic members as illustrated, the back flow plate 130 which is steel can provide protection by reducing impact upon the inlet end cap and therefor erosion of the inlet end cap. This is achieved by having the inlet flow apertures 134 of the back flow plate 130 be matched and aligned with the inlet flow openings 76 of the filter cartridges 12.

An optional final structure may be provided by a vane mist extractor 138 located just upstream of the outlet nozzle of the outlet port 24. For example, mist extractor 138 can be a device made up of 18 to 24 gauge carbon or stainless steel, most commonly used, rolled or pressed into a shape that imparts inertial impaction on liquid droplets that have been coalesced by the filter coalescer elements located upstream. The coalesced drops will impact the vane plates and drain down to the liquid collection sump located below. Other alternative mist extraction technologies can be used such as cyclones or wire mesh pads.

Figure 29:
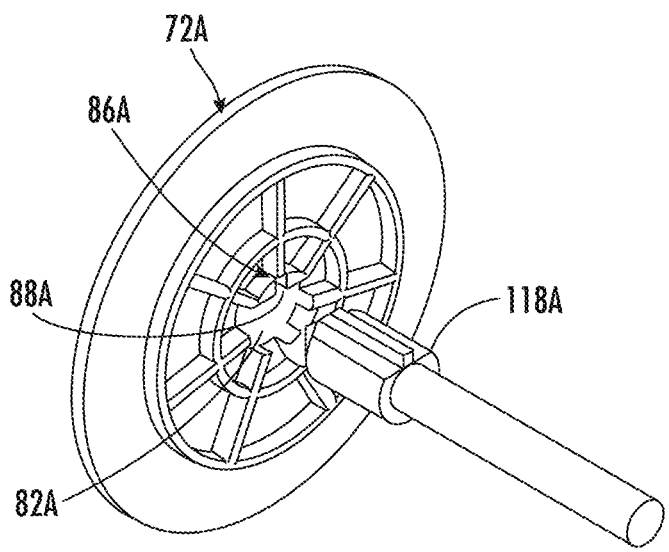
FIG. 29, 30, 31 are isometric views of outlet end caps three alternative key embodiments of the closed outlet end cap and the spear member, which may be used and substituted for the spear member and outlet end cap of FIGS. 15 and 18, according to alternative embodiments (the description of the embodiment according to FIG. 1 being otherwise applicable to these alternative embodiments).
Figure 30:
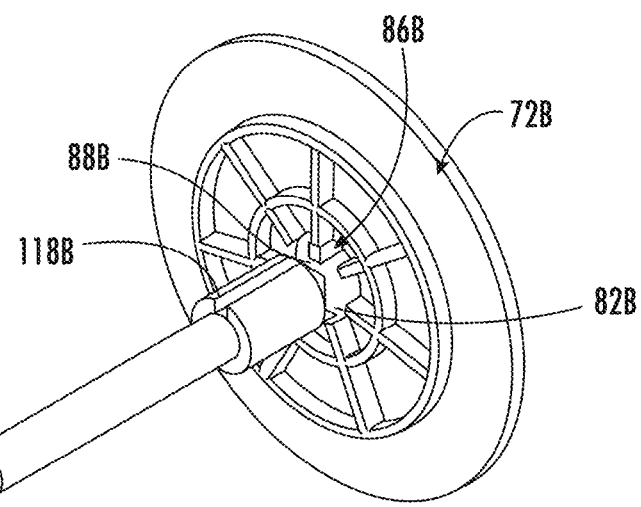
Figure 31:
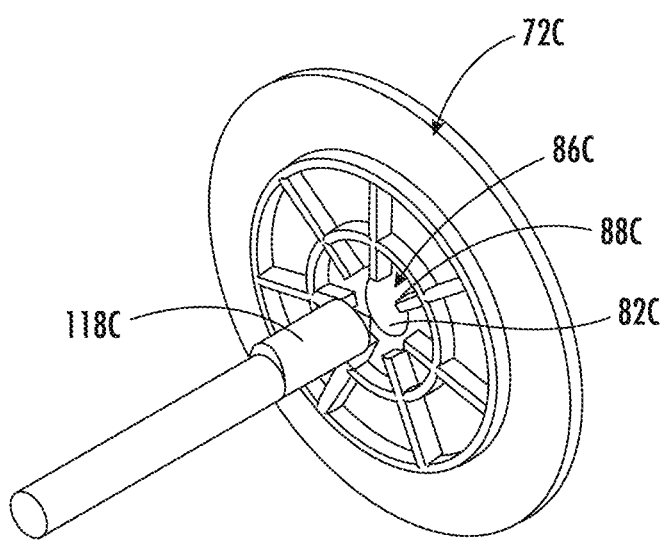

Referring to FIGS. 29, 30 and 31 other examples outlet end caps 72A, 72B, 72C with alternative examples of keys 86A, 86B and 86C (and complimentary locking spear members 118A, 118B, 118C) that are useable in the embodiment of FIG. 1 are shown. It is understood any of the outlet end caps 72A, 72B, 72C may be substituted and replace outlet end cap 72 of the first embodiment; and respective locking spear members 118A, 118B, 118C may be substituted and replace spear member 118 of the first embodiment; with the remaining description and figures of the earlier embodiment applicable to these embodiments shown in FIGS. 29-31.

Similar to the earlier embodiment, each of these include an off-center key in the form of an interruption that can be provided by a flat, a ridge, a groove, an eccentric or any combination thereof (e.g. two or more selected from the group of key geometry options). For example, FIG. 29 illustrates the key 86A in the form of a groove 88A at the entry of socket 82A (which may also define one or more flats as shown); FIG. 30 illustrates the key 86B in the form of a ridge 88B at the entry of the socket 82B (which may also define one or more flats as shown); and FIG. 31 illustrates the key 86C in the form of an eccentric 88C at the entry of the socket 82C (which although not shown could be supplemented with additional flat, groove and/or ridge if desired). More complex keying using combinations of these are also contemplated.

While the downstream face of the outlet end cap 72 is flat with reinforcement ribbing on the upstream and inside face, as also shown in these embodiments (and what may be added to the earlier embodiment for end cap 72) is that reinforcement ribbing 150 may be integrated into the downstream external face of the outlet end caps 72A, 72B, 72C as shown to provide reinforcement. For example, the provide additional support to hold the sockets 82, 82A, 82B, 82C in a concentric and perpendicular orientation during and after the thermal bonding process to the tubular ring 60 of filter media 62

Preferred Filter Cartridge Parameters/Ranges

Preferably, the systems and filter cartridges thereof will have one or more (and more preferably all) of the following characteristics:

a. Liquid Removal Efficiency: 99.98% removal efficiency at 0.5 micron and larger liquid droplets as a standard. Efficiencies can range down to 99.98% of 0.3 micron and larger liquid droplets when utilizing 0.3 micron rating coalescer cartridges under certain conditions;
b. Housing outer Diameter Range: 4-144 inches (more typical Standard Housing Diameter Range: 8-84 inches);
c. Cartridge outer Diameter Size Range: 2-12 inches (more typical Standard Cartridge Diameter Size Range: 3-6 inches);
d. Cartridge Length Range: 12-120 inches long (more typical standard Cartridge Length: 40-60 inches);
e. System Mist Extractor Options: Vane, Wire Mesh, Cyclonic separator (Standard Mist Extractor: Vane (CS and SS options));
f. Inlet/Outlet Nozzle Size Ranges: 1-60 inches;
g. Housing design pressure range: 150 PSI through 10,000 PSI;
h. Gas flows that can be filtered (not limited to) Natural Gas (standard), Hydrogen, Air, etc.;
i. Solid Contaminants (not limited to): Sand, pipe scale, iron oxides, iron sulfides;
j. Semi-Solid Contaminants (not limited to): oil wetted solids, paraffins, asphaltenes, frac gels, etc.; and
k. Liquid Contaminants (not limited to): water, brine, lube oil, natural gas liquids, gas sweetening solvents, gas dehydration liquids, pipeline injection chemicals.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter cartridge, comprising:
a tubular ring of a filter media surrounding a central cavity, the tubular ring extending around a central axis between an inlet end and an outlet end;
an outlet end cap secured to the outlet end of the tubular ring, the outlet end cap including a cover portion closing the central cavity at the outlet end;
a projection projecting from the cover portion toward the inlet end into the central cavity, the projection intersecting the central axis and including an annular wall defining a socket, the annular wall having an interruption along an inner periphery thereof providing a key;
an inlet end cap secured to the inlet end, the inlet end cap defining a flow opening entering into the central cavity;
a baffle at the inlet end cap, the key is arranged relative to the baffle at a predetermined orientation to direct fluid flow away from a gravitational bottom of the tubular ring of the filter media, the tubular ring of filter media extending horizontally between the inlet end cap and the outlet end cap; and wherein the baffle is integrated into the inlet end cap and partially obstructs a bottom half of the inlet end cap, wherein the flow opening includes an upper portion above the central axis and a lower portion below the central axis, with the baffle providing a greater flow area to the upper portion than the lower portion.

2. The filter cartridge of claim 1, wherein the annular wall defines a partial circle along the inner periphery thereof, and wherein the interruption comprises a flat, a ridge, a groove, an eccentric or any combination thereof.

3. The filter cartridge of claim 1, wherein the interruption comprises a flat facing inwardly toward the central axis.

4. The filter cartridge of claim 3, wherein the interruption is provided an axially extending chord section extending along side the central axis.

5. The filter cartridge of claim 1, wherein the tubular ring of the filter media provides a single filtration stage, the filter cartridge being a single stage filter.

6. The filter cartridge of claim 1, wherein the upper portion defines a flow area that is at least 1.1 times greater than the lower portion.

7. The filter cartridge of claim 1, wherein the baffle is configured as a handle.

8. The filter cartridge of claim 1, wherein an outer radial periphery of the inlet end cap carries a radial seal configured for radially outward sealing.

9. The filter cartridge of claim 1, wherein the filter media comprises an aerosol coalescer comprising a depth filter media with the filter media defining a filtration flow path in a radial direction through the depth filter, with the depth filter media being configured so that fluid to pass through at least 0.6 centimeter of the filter media before exiting the filter media when a pressure differential exists between the central cavity and an external.

10. A filter assembly comprising the filter cartridge of claim 1, the assembly comprising:
a housing comprising a pressure vessel and a door, the pressure vessel including a horizontally extending tubular wall and having an inlet port, an outlet port and an access port at one end of the horizontally extending tubular wall, the door mounted to the pressure vessel, the door having an open position allowing access into the pressure vessel and a closed position sealing shut the access port;
a partition internally mounted within the horizontally extending tubular wall, the partition having at least one filtration opening, and dividing the pressure vessel into an inlet side and an outlet side, the access port being at the inlet side;
an outlet grid internally mounted within the horizontally extending tubular wall in horizontally spaced relation from the partition;
at least one basket assembly, each basket assembly mounted to partition through a corresponding respective member of the at least one filtration opening, each basket assembly comprising the filter cartridge and a basket removably receiving the filter cartridge, the basket comprising: (a) a ring mount including a solid tubular portion, (b) a perforated cylindrical tube, and (c) a basket cap mounted to the outlet grid; wherein the ring mount and the basket cap are secured to opposing ends of the perforated cylindrical tube;
wherein the filter cartridge is installed in the basket with a seal sealing between the ring mount and the inlet end cap, the basket cap supporting a lock projection that extends internally toward the ring mount, the lock projection having a lock surface keyed to the key that rotationally fixes the filter cartridge and the basket at a predetermined angular orientation.

11. The filter assembly of claim 10, wherein a plurality of the at least one basket assembly are provided in parallel fluid circuit with each other.

12. A filter basket assembly including a filter cartridge and a basket removably receiving the filter cartridge, the filter cartridge, comprising:
(a) a tubular ring of a filter media surrounding a central cavity, the tubular ring extending around a central axis between an inlet end and an outlet end;
(b) an outlet end cap secured to the outlet end of the tubular ring, the outlet end cap including a cover portion closing the central cavity at the outlet end;
(c) a projection projecting from the cover portion toward the inlet end into the central cavity, the projection intersecting the central axis and including an annular wall defining a socket, the annular wall having an interruption along an inner periphery thereof providing a key;
(d) an inlet end cap secured to the inlet end, the inlet end cap defining a flow opening entering into the central cavity;
the basket comprising: a ring mount including a solid tubular portion; a perforated cylindrical tube, and a basket cap including a central mounting post; wherein the ring mount and the basket cap are secured to opposing ends of the perforated cylindrical tube;
wherein the filter cartridge is installed in the basket with a seal sealing between the ring mount and the inlet end cap, the post supporting a lock projection that extends internally toward the ring mount, the lock projection having a lock surface keyed to the key that rotationally fixes the filter cartridge and the basket at a predetermined angular orientation.

13. The filter basket assembly of claim 12, further comprising a baffle on the inlet end cap positioned along a bottom portion due to the lock surface keyed to the key.

14. A filter cartridge, comprising:
a tubular ring of a filter media surrounding a central cavity, the tubular ring extending around a central axis horizontally between an inlet end and an outlet end;
an outlet end cap secured to the outlet end of the tubular ring, the outlet end cap including a cover portion closing the central cavity at the outlet end;
an inlet end cap secured to the inlet end, the inlet end cap defining a flow opening entering into the central cavity;
a baffle at the inlet end cap, the baffle arranged relative to the flow opening to direct fluid flow away from a gravitational bottom of the tubular ring of the filter media;
wherein the baffle defines a ledge projecting across a segment of the flow opening, the ledge extending below the central axis.

15. The filter cartridge of claim 14, wherein the baffle is configured as a handle.

16. The filter cartridge as in claim 14, wherein the ledge defines a chord extending across the flow opening of the inlet end cap.

17. The filter cartridge of claim 14, wherein an outer radial periphery of the inlet end cap carries a radial seal configured for radially outward sealing.

18. The filter cartridge of claim 14, further comprising a key arranged relative to the baffle at a predetermined orientation, the key adapted to ensure proper orientation for directing fluid flow away from the gravitational bottom of the tubular ring of the filter media.

19. The filter cartridge of claim 18, further comprising a projection projecting from the cover portion toward the inlet end into the central cavity, the projection intersecting the central axis and including an annular wall defining a socket, the annular wall having an interruption along an inner periphery thereof providing the key.

20. The filter cartridge of claim 18, wherein the key comprises an interruption comprising a flat, a ridge, a groove, an eccentric or any combination thereof.

21. The filter cartridge of claim 20, wherein the key is provided by one of the inlet and outlet end caps.

22. The filter cartridge of claim 20, wherein the key comprises an interruption offset from the central axis, providing an off-center key.

23. A filter cartridge, comprising:
a tubular ring of a filter media surrounding a central cavity, the tubular ring extending around a central axis horizontally between an inlet end and an outlet end;
an outlet end cap secured to the outlet end of the tubular ring, the outlet end cap including a cover portion closing the central cavity at the outlet end;
an inlet end cap secured to the inlet end, the inlet end cap defining a flow opening entering into the central cavity;
a baffle at the inlet end cap, the baffle arranged relative to the flow opening to direct fluid flow away from a gravitational bottom of the tubular ring of the filter media; and
wherein the baffle is integrated into the inlet end cap and partially obstructs a bottom half of the inlet end cap, wherein the flow opening includes an upper portion above the central axis and a lower portion below the central axis, with the baffle providing a greater flow area to the upper portion than the lower portion.

24. The filter cartridge of claim 23, wherein the upper portion defines a flow area that is at least 1.1 times greater than the lower portion.

25. A filter cartridge, comprising:
a tubular ring of a filter media surrounding a central cavity, the tubular ring extending around a central axis horizontally between an inlet end and an outlet end;
an outlet end cap secured to the outlet end of the tubular ring, the outlet end cap including a cover portion closing the central cavity at the outlet end;
an inlet end cap secured to the inlet end, the inlet end cap defining a flow opening entering into the central cavity;
a baffle at the inlet end cap, the baffle arranged relative to the flow opening to direct fluid flow away from a gravitational bottom of the tubular ring of the filter media; and
wherein the baffle integral with a border frame portion of the inlet end cap and provided by a web traversing across the border frame portion, wherein the web is recessed within a well spaced from an upstream face of the inlet end cap, so that the well first receives fluid flow before entering the flow opening.

26. A filter basket assembly including a filter cartridge and a basket removably receiving the filter cartridge, the filter cartridge, comprising:
(a) a tubular ring of a filter media surrounding a central cavity, the tubular ring extending around a central axis horizontally between an inlet end and an outlet end;
(b) an outlet end cap secured to the outlet end of the tubular ring, the outlet end cap including a cover portion closing the central cavity at the outlet end;
(c) an inlet end cap secured to the inlet end, the inlet end cap defining a flow opening entering into the central cavity;
(d) a baffle at the inlet end cap, the baffle arranged relative to the flow opening to direct fluid flow away from a gravitational bottom of the tubular ring of the filter media; and
the basket comprising: a ring mount including a solid tubular portion; a perforated cylindrical tube, and a basket cap including a central mounting post; wherein the ring mount and the basket cap are secured to opposing ends of the perforated cylindrical tube;
wherein the filter cartridge is installed in the basket with a seal sealing between the ring mount and the inlet end cap; and
wherein the filter cartridge is oriented within the basket with the baffle arranged along the bottom of the flow opening.

27. A filter assembly comprising a filter cartridge, comprising:
(a) a tubular ring of a filter media surrounding a central cavity, the tubular ring extending around a central axis horizontally between an inlet end and an outlet end;
(b) an outlet end cap secured to the outlet end of the tubular ring, the outlet end cap including a cover portion closing the central cavity at the outlet end;
(c) an inlet end cap secured to the inlet end, the inlet end cap defining a flow opening entering into the central cavity;
(d) a baffle at the inlet end cap, the baffle arranged relative to the flow opening to direct fluid flow away from a gravitational bottom of the tubular ring of the filter media
the assembly further comprising:
a housing comprising a pressure vessel and a door, the pressure vessel including a horizontally extending tubular wall and having an inlet port, an outlet port and an access port at one end of the horizontally extending tubular wall, the door mounted to the pressure vessel, the door having an open position allowing access into the pressure vessel and a closed position sealing shut the access port;
a partition internally mounted within the horizontally extending tubular wall, the partition having at least one filtration opening, and dividing the pressure vessel into an inlet side and an outlet side, the access port being at the inlet side;
an outlet grid internally mounted within the horizontally extending tubular wall in horizontally spaced relation from the partition;
at least one basket assembly, each basket assembly mounted to partition through a corresponding respective member of the at least one filtration opening, the basket assembly comprising the filter cartridge and a basket removably receiving the filter cartridge, each basket comprising: (a) a ring mount including a solid tubular portion, (b) a perforated cylindrical tube, and (c) a basket cap mounted to the outlet grid; wherein the ring mount and the basket cap are secured to opposing ends of the perforated cylindrical tube;
wherein the filter cartridge is installed in the basket with a seal sealing between the ring mount and the inlet end cap, wherein the filter cartridge is oriented in a predetermined fixed rotational orientation within the basket with the baffle arrange along the bottom of the flow opening.

28. The filter assembly of claim 27, wherein a plurality of the at least one basket assembly are provided in parallel fluid circuit with each other.

29. The filter assembly of claim 27, further comprising a removable backflow plate arranged upstream of the partition between the partition and the access port, the backflow plate arranged in close proximity over the at least one basket assembly to prevent the filter cartridge from dislodging and/or unsealing from the ring mount in the event of a back-pulse, the back flow plate further comprising:
- at least one flow aperture, with one flow aperture axially aligned with the flow opening of each of the at least one basket assembly, and at least one second baffle, each second baffle along a corresponding respective member of the at least one flow aperture and in axial alignment with the baffle of the filter cartridge of a corresponding respective member of the at least one basket assembly to protect the inlet end cap from gas erosion during use.

30. A filter cartridge for installation within a housing, the filter cartridge comprising:
- an elongated, cylindrical filter media body circumscribing a central cavity;
- a first end cap at one end of the body, the first end cap including a projection extending outwardly away from the end cap, the projection including a geometry for engagement with the housing when the cartridge is installed into the housing to rotationally orient the cartridge relative to the housing; and
- a second end cap at another end of the body, the second end cap including a peripheral body portion defining a central opening into the central cavity, the peripheral body portion having a ledge projecting across a segment of the central opening, the ledge having a predetermined relationship with the projection such that the ledge is positioned toward a lower side of the cartridge when the cartridge is installed within the housing.

31. The filter cartridge as in claim 30, wherein the peripheral body portion of the second end cap has an annular configuration.

32. The filter cartridge as in claim 30, wherein the ledge defines a chord extending across the central opening of the second end cap.

33. A filter assembly comprising a filter cartridge and a housing, the filter cartridge comprising:
- an elongated, cylindrical filter media body circumscribing a central cavity;
- a first end cap at one end of the body, the first end cap including a projection extending outwardly away from the end cap, the projection including a geometry in engagement with the housing when the cartridge is installed into the housing to rotationally orient the cartridge relative to the housing; and a second end cap at another end of the body, the second end cap including a peripheral body portion defining a central opening into the central cavity, the peripheral body portion having a ledge projecting across a segment of the central opening, the ledge having a predetermined relationship with the projection such that the ledge is positioned toward a lower side of the cartridge when the cartridge is installed and supported horizontally within the housing.

* * * * *